(12) United States Patent
Velinsky et al.

(10) Patent No.: US 7,214,907 B2
(45) Date of Patent: May 8, 2007

(54) APPARATUS FOR DISPENSING PAVEMENT SEALANTS

(75) Inventors: Steven A. Velinsky, Davis, CA (US); Duane A. Bennett, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 113 days.

(21) Appl. No.: 10/965,707

(22) Filed: Oct. 13, 2004

(65) Prior Publication Data
US 2005/0109754 A1 May 26, 2005

Related U.S. Application Data

(63) Continuation of application No. 10/366,534, filed on Feb. 12, 2003, now Pat. No. 6,809,294.

(51) Int. Cl.
*H05B 1/00* (2006.01)
(52) U.S. Cl. .................. 219/213; 404/107; 392/465
(58) Field of Classification Search ................ 219/200, 219/213, 420; 392/441, 449, 465, 466, 478; 404/101, 107, 108–111
See application file for complete search history.

(56) References Cited

U.S. PATENT DOCUMENTS

| | | |
|---|---|---|
| 2,530,777 A | 11/1950 | Middlestadt |
| 3,106,344 A | 10/1963 | Baird, Jr. et al. |
| 3,378,673 A | 4/1968 | Hopper |
| 3,399,426 A | 9/1968 | Weasel, Jr. et al. |
| 3,603,487 A | 9/1971 | Cook |
| 3,907,162 A | 9/1975 | Maxfield |
| 3,976,230 A | 8/1976 | Sperry |
| 4,057,456 A | 11/1977 | Renegar et al. |
| 4,154,368 A | 5/1979 | Gusmer et al. |
| 4,485,942 A | 12/1984 | Petrecca |
| 4,502,814 A | 3/1985 | Trimble |
| 4,545,504 A | 10/1985 | Fabel et al. |
| 4,771,920 A | 9/1988 | Boccagno et al. |
| 5,178,487 A | 1/1993 | Dresselhaus |
| 5,325,994 A | 7/1994 | Mizialko et al. |
| 5,439,313 A | 8/1995 | Blaha et al. |
| 5,462,206 A | 10/1995 | Kwasie |
| 5,468,094 A | 11/1995 | Vanderpan et al. |
| 5,832,178 A | 11/1998 | Schave |
| 5,859,953 A | 1/1999 | Nickless |
| 5,945,160 A | 8/1999 | Kobak et al. |
| 5,967,375 A | 10/1999 | Barnes |
| 5,974,227 A | 10/1999 | Schave |
| 6,049,658 A | 4/2000 | Schave et al. |
| 6,109,826 A | 8/2000 | Mertes |
| 6,171,017 B1 | 1/2001 | Watkins |

*Primary Examiner*—Thor S. Campbell
(74) *Attorney, Agent, or Firm*—John P. O'Banion

(57) ABSTRACT

Apparatus and methods for applying heated sealants, such as molten polymeric material, to surfaces such as for filling cracks in pavement surfaces. Aspects of the invention include block cutting assembly, heated dispensing hose, and crack filling applicator head. By way of example, the block cutting assembly comprises a ram device for driving sealant blocks against a heated cutting member which severs the blocks to speed liquefaction within the heated sealant chamber. An associated enclosure incorporates a loading door preferably configured for operation in response to the position of the ram device. The heated dispensing hose may comprise a heating element running through the interior of the hose to heat sealants as they pass through the hose. The crack filling applicator head comprises a dispensing tube upon which a sealing chamber is coupled for retaining a quantity of liquid sealant proximal to the pavement surface being filled.

113 Claims, 14 Drawing Sheets

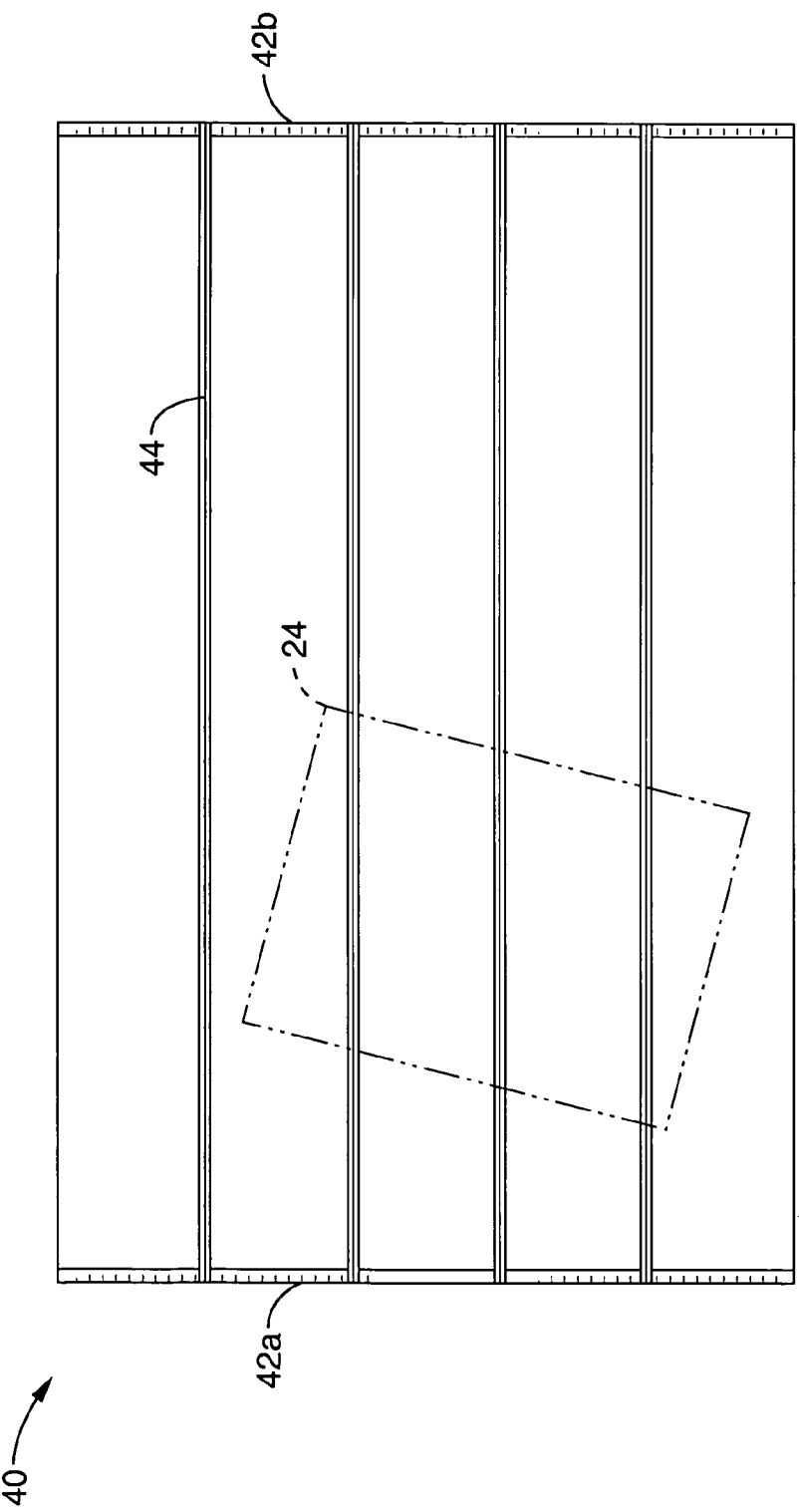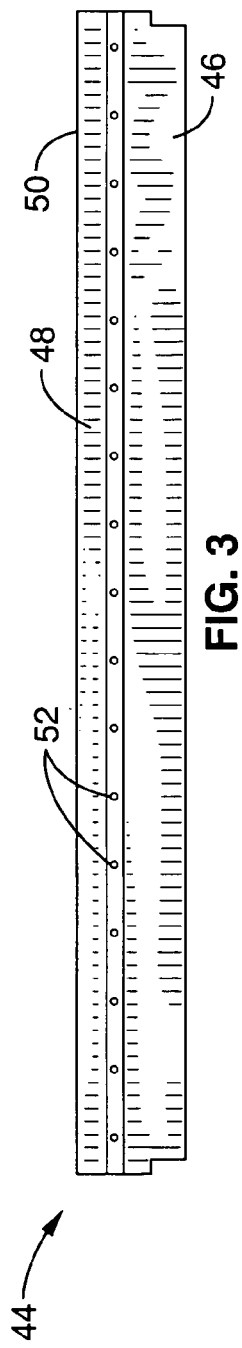
FIG. 2
FIG. 3

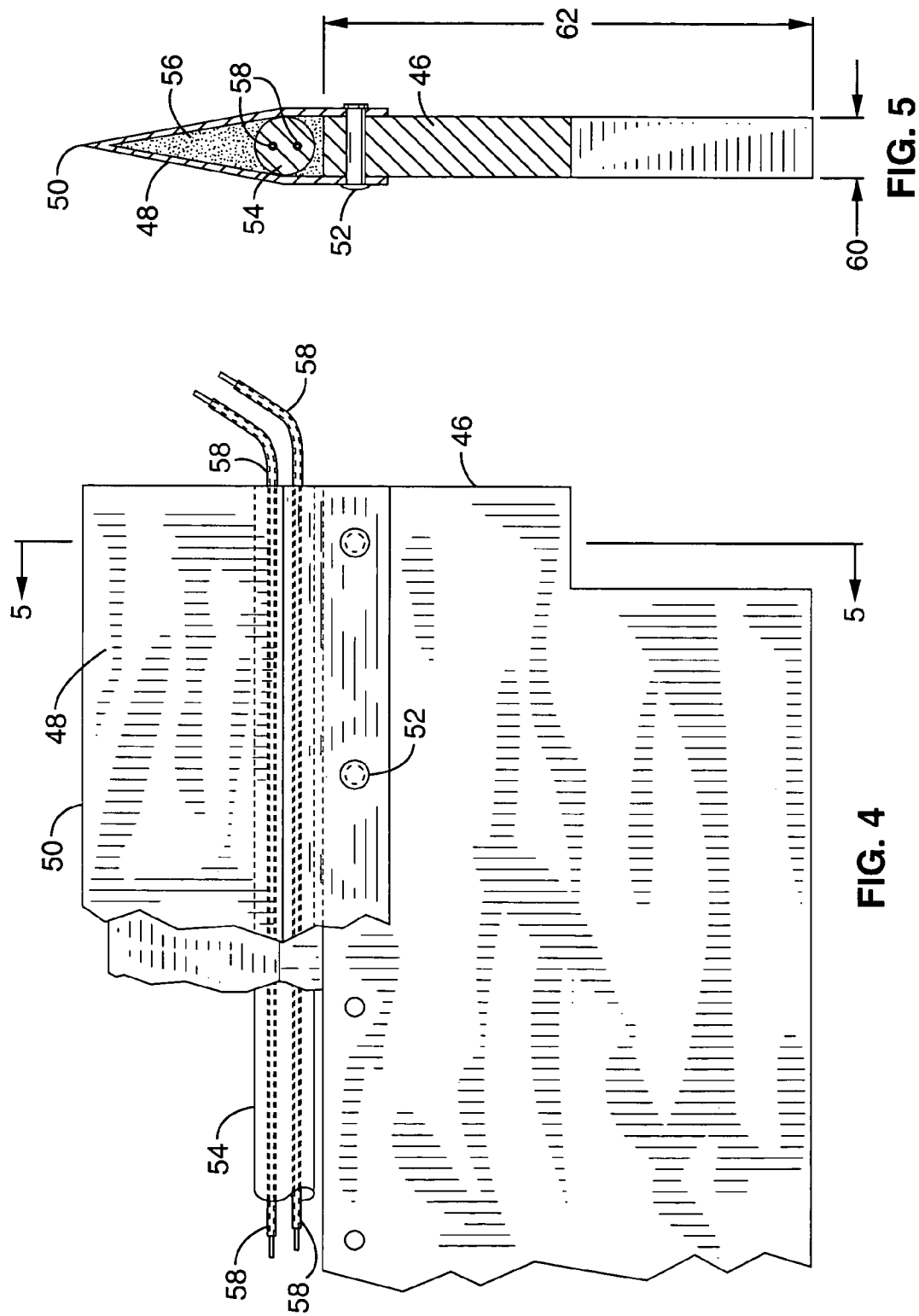

APPARATUS FOR DISPENSING PAVEMENT SEALANTS

CROSS-REFERENCE TO RELATED APPLICATIONS

This application is a continuation of U.S. application Ser. No. 10/366,534 filed on Feb. 12, 2003, now U.S. Pat. No. 6,809,294 incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to roadway repair, and more particularly to an apparatus for applying hot sealants to cracks or similar areas to be filled upon a surface, such as a paved roadway surface.

2. Description of the Background Art

It will be appreciated that an unfilled crack in a paved roadway is subject to expansion from various sources, such as from ice formation, and that cracked surfaces can be subject to erosion. By filling cracks and similar voids in pavement surfaces, the longevity of the surface can be greatly increased. Typically these cracks, and similar small voids, are filled during pavement maintenance operations by melting a polymeric sealer and introducing a sufficient quantity of the sealer into the crack to completely fill it and seal it from the environment.

Hot sealants are often applied using a portable sealant melter that melts blocks of solid sealant material into a liquid state. The molten sealant is then retained in a sealant reservoir generally having a capacity of from about two hundred to about four hundred gallons, and is typically held at a temperature of over 300° F. for application. The sealant material is usually purchased in solid blocks that weight approximately twenty to fifty pounds.

Currently, the process of sealing cracks, such as in pavement, is subject to a number of drawbacks and inefficiencies that slow the work and increase the associated cost. In typical sealing applications, the sealant is dispensed from the sealant melter, into which blocks of solid sealant must be periodically added to maintain the reservoir of molten sealant at a desired level. Newly added blocks of sealant liquefy slowly, thereby constraining the rate at which the liquid sealant may be dispensed from the sealant melter system at the desired temperature. Due to the slow speed with which sealants are often applied manually, the slow rate of liquefaction generally does not pose a significant detractor of current sealant melting operations.

However, as sealant application becomes increasingly subject to automation, the slow rate at which solid blocks of sealant are liquefied can limit the speed of sealant application and associated operations.

One known approach to increasing the rate by which solid blocks are liquefied within a sealant melter is to route a series of large pipes, approximately two to three inches in diameter, over the heated sealant chamber opening and pass a heated oil through the pipes. The blocks of solid sealant material are placed over the pipes and required to melt under gravity feed in response to the heat in the pipes before entering the melting chamber. A number of minutes may pass before the block is melted and pieces of the block fall into the melter reservoir. Furthermore, the large pipe diameter, which is necessitated to provide sufficient rigidity, slows the transition of the material into the sealant reservoir, as a substantial portion of the block must be melted away prior to entry into the sealant reservoir. As a result, such "automated" systems are limited in their ability to rapidly melt sealant to a desired benchmark that the sealant blocks be divided within less than a minute to speed melting within the sealant chamber.

Additional drawbacks exist with regard to equipment used to dispense melted sealants. Typically, the heated sealants are dispensed from a heated chamber to an applicator head which then directs the liquid sealant into the pavement crack. Prior to reaching the applicator head, the heated sealant passes through a hose to reach the applicator. However, as the sealant flows through conventional hoses, heat is lost. As a result, sealant viscosity increases which can prevent proper application of the material, and in some cases lead to clogging within the hose. Furthermore, as a consequence of using an unheated hose, the viscosity of the liquid sealant during application is variable and depends on the rate at which the material is being applied, with longer delays during application leading to further cooling of the heated sealant in the hose. It should also be readily appreciated that stopping fluid flow through the hose for an extended period of time, such as thirty minutes, can allow the sealant to solidify in the hose and applicator head, requiring expensive servicing of the equipment.

Insulated and/or heated hoses have been created to remedy the situation and maintain a high liquid sealant temperature as it traverses the hose. These heated hoses generally rely on passing a heated fluid, such as an oil, through passageways within hoses joined to the exterior of the liquid sealant conveyance hose. This method of externally heating the sealant carrying hose so as to heat the contents therein has a number of drawbacks. First, the hose itself is subjected to temperatures from the heater that are substantially in excess of the desired sealant temperature in order to achieve a desired temperature within the faster flowing central portion of the hose passageway. It should be noted that the heat from the heated fluid is insulated from the sealant material being heated by the walls of the heated fluid hose and the walls of the sealant hose. Additionally, the common use of hoses with a circular cross section limits the heat conductive interface available between the heater hose(s) and the sealant hose. However, the incorporation of noncircular hoses leads to increased fabrication and maintenance costs. Secondly, the heating element must encircle the exterior of the hose to provide even heating of the flowing material. Thirdly, layers of insulation must be built up surrounding the combination of heating hose(s) and sealant hose to reduce the burn hazard posed to operators and to reduce heat losses. In view of the preceding discussion, it is not surprising that the resultant sealant hose has limited flexibility, is burdensome to maintain, and is prone to cracking along with similar leakage inducing conditions. Therefore, although current heated hoses provide a number of benefits they are also expensive, heavy, inflexible, prone to leakage, and are a burden to maintain.

Additional problems arise further downstream of the sealant hose during the application of sealants to cracks in pavement surfaces. Traditional sealant applicator heads, which receive liquid sealants through the sealant hose, rely on dispensing a flow of sealant over a crack to fill the crack under the effect of gravity and therein seal the crack. That approach, however, is subject to a number of detractors that limit application speed along with the benefits and longevity of sealing the crack. It should be recognized that cracks generally do not follow regular straight paths and that they vary in width and depth along the span of a given crack. Since the volume of the crack ultimately depends on crack width and depth, the amount of sealant required to fill the crack varies along the crack span. When manually applying sealants, the varying crack volume is accommodated by adjusting the speed of application or the rate at which sealant is dispensed so that an appropriate amount of sealant is applied. However, modulating sealant application speed is inefficient and not always practical. This is particularly true regarding systems which automatically dispense the heated sealant, in that the crack must be monitored as it is being filled while applicator motion must vary in response to crack capacity. Another approach is to match the sealant dispensing dynamics, such as flow rate, to the characteristics of the crack. However, this is difficult to achieve and, due to the delays involved, can lead to underflow or overflow of the sealant which can be considered a miss-fill of the crack. In addition, with either of these approaches, the sealant is only "drizzled" into the crack. As a result, the sealant generally does not seat deeply into the crack, thereby allowing water to enter the crack and further reduce the security of sealant retention while substantially reducing the effectiveness of the sealant patch.

Therefore, a need exists for advanced sealant delivery methods and devices that provide more efficient sealant delivery for filling of pavement cracks. The present invention satisfies those needs, as well as others, and overcomes the deficiencies of previously developed pavement crack sealing devices and methods.

SUMMARY OF THE INVENTION

The present invention generally comprises a system for speeding and simplifying the process of applying heated sealants, such as to cracks in pavement surfaces or similar fill applications. Aspects of the system include an apparatus for (1) speeding sealant liquefaction by reducing block size of a hardened sealant prior to its entry into a heated reservoir of molten sealant, (2) heating sealants being fluidly communicated to an applicator, and (3) applying liquid sealant under pressure to a crack, or other anomaly, in a surface which is to be filled.

The foregoing aspects of the present invention may be implemented separately within pavement sealing equipment and operations, or utilized in combination wherein the complementary benefits produced can provide substantial efficiency gains and simplify the implementation of pavement crack sealing operations, and similar pavement maintenance activities.

Various combinations of these inventive aspects are particularly well suited for use on automated pavement crack filling equipment wherein sealant application speed would be otherwise limited or subject to undesired variation of sealant temperature, flow, or other material characteristics.

One aspect of the system comprises an apparatus for severing solid blocks of sealant material (i.e. pavement sealants for asphalt, concrete, or other surfaces) into segments before introduction into a heated reservoir of molten material. It should be appreciated that large sealant blocks have a low surface area to volume ratio, which results in a slow melting rate when immersed into the molten sealant within the reservoir of a sealant melter. The present invention recognizes that severing the block into small pieces increases the overall surface area to volume ratio, thereby speeding the melting rate of the solid material. By increasing the melting rate of the material, it will be appreciated that higher application rates may be supported by an associated sealant melter.

The present invention provides for increasing the liquefaction rate of solid sealant material while maintaining a level of safety to personnel utilizing the equipment. The block cutter aspect of the present invention may be utilized within crack sealing equipment, large area sealant devices, or other devices that are configured for dispensing volumes of molten sealants.

This aspect of the invention comprises means for severing a received block of solid material and preferably also include a means for applying a feed pressure to a received block of solid material in contact with the block of solid material. These means may be integrated within a sealant melter apparatus or used in combination with elements forming a sealant melter or similar device for retaining a quantity of molten material.

The means for severing a block of solid material can be beneficially embodied with at least one heated blade, and preferably a plurality of heated blades separated from one another, for segmenting solid blocks of sealant.

The solid block may be cut under the force of gravity driving the heated blades through the solid material of the blocks; however, by applying a feed pressure to the blocks they can be segmented more rapidly and consistently.

An embodiment of a means for applying feed pressure may comprise a movable member configured for engaging the solid block with the blades and a source of feed pressure for the movable member. This means for supplying feed pressure may be referred to as a "ram device" which has a "ram plate" moved by a "ram drive". The movable member may be moved in response to manual feed pressure, such as from a user operated handle, or from an actuator (i.e. mechanical, electrical, pneumatic, hydraulic, and so forth). Utilizing an automatically driven ram device is preferred as it reduces the personnel overhead for operating the device. Furthermore, an automatically driven ram device is especially well suited for adjusting block feed rate in response to conditions detected within the apparatus to which it is associated, such as to liquefaction rate, reservoir level, dispensing rate, and user control inputs or other inputs such as safety sensors.

The movable member of the ram device makes contact with the sealant blocks and, ultimately, may contact the block cutting assembly when in a fully extended mode. The movable member may be alternatively referred to as a pressure plate, or ram plate. The blades are preferably electrically heated, although other forms of heating such as using a heated liquid, may be alternatively utilized without departing from the teachings of the invention. After being segmented by the heated blades, the segments of the original solid sealant block enter the molten sealant reservoir and are more readily liquefied than in the case of receiving uncut blocks of sealant. Decreasing the time required to melt a sealant block results in the ability to support higher maximum application rates for the liquefied sealant material.

The heated blades and the ram device are both preferably contained within a substantially sealed enclosure which aids in retaining heat and preventing hazardous sealant losses, such as from splashing when sealant blocks, or segments therefrom, fall into the reservoir of molten sealant. The pressure plate of the ram device is preferably hydraulically driven, pneumatically driven, or electrically driven. An optional feature of the block cutter is the ability to discontinue, and/or retract, from driving the sealant blocks through the cutter assembly in response to opening the loading door, such as for loading additional blocks into the reservoir retained within the enclosure. The loading door may be additionally, or alternatively, configured with an interlock to prevent door operation during at least portions of the ram device operating cycle.

It should be appreciated that although a single ram device is contemplated for use with a given sealant melter device, a sealant melter (or similar device for retaining molten sealant) can be adapted with multiple ram devices. The use of multiple feed units would allow segments of material from the sealant blocks to be introduced into the sealant reservoir at a more rapid and consistent rate.

Application rates of liquid sealant can vary and, therefore, the sealant melter of the present invention is configured to supply molten sealant over a wide range of sealant supply volumes. To regulate the rate at which solid material is added to the reservoir of sealant, the system may beneficially include means for regulating the power supplied to the heater within the cutting blades and/or a means for varying the pressure applied by the ram device.

The means for regulating heater power may be implemented in an electrical mode, a liquid mode, or an equivalent heating method. By way of example, a thermal control system can be coupled to the heater for regulating the output of the heating element, such as in response to the registered temperature of the heated sealant. In this way, the heat output is increased when sealant blocks are added to the molten sealant, the entry of which would otherwise reduce the average sealant temperature in the reservoir. Low levels of heat are applied to the sealant chamber at other times, for maintaining sealant temperature at a desired level without producing adverse over-temperature effects, such as scorching of the retained sealant.

A block cutting mechanism for a sealant application system is thereby provided according to this aspect of the invention to speed liquefying solid blocks of sealant, wherein higher application rates may be supported for a given reservoir volume. The apparatus generally comprises a heated chamber within which a reservoir of molten material is to be retained, means for severing a received block of solid sealant material into multiple segments, and means for applying a feed pressure to the received block of solid material engaged with the means for severing the received block of solid material.

The means for severing the blocks may be configured with at least one cutting member, and preferably a series of separated cutting members (i.e. row of parallel cutting members), as well as a means for heating the cutting member(s) to a sufficient temperature to speed block cutting. By way of example, electrical heating may be provided by retaining an electrical heating element within, or upon, the cutting member and regulating the power applied to the heating element to support a desired feed rate by which blocks of said solid material are being severed into smaller block segments. Alternatively, a heated liquid may be passed through one or more passageways in the cutting member(s) for heating. In either case, a control circuit is configured for regulating the heat output of the heating elements to support a desired block feeding rate through the cutting member(s).

It should also be appreciated that the cutting members may be alternatively arranged in a grid, or similar configuration, such as an overlapped format, wherein one or more cutting members intersect one another. This arrangement allows for cutting the block of sealant into smaller segments; however, it is generally more complex to implement than a parallel cutter arrangement.

Each cutting member of the cutting assembly is preferably shaped with a narrow cross section in a direction perpendicular to block feed travel, comprising a first cross section, for cutting through sealant blocks without melting an inordinate amount of sealant material. It will be appreciated that narrow cutting blades can significantly increase block cutting speed for a given amount of heat being generated within the cutting blades. However, each cutting member of the cutting assembly preferably comprises a deep support structure, comprising a second cross section, that extends back from the leading edge of the blade in a direction parallel to the block feed direction through the cutting assembly. The narrow first cross section allows blocks to be fed through the cutter rapidly, while the depth of the support structure along the second cross section provides reinforcement of the narrow cutter heads to prevent bending of the cutters under the cumulative effects of block weight and feed pressure. The depth of the blade structure (second cross section) is preferably at least double the width (first cross section) and more preferably from at least three to about ten times the width of the cutter.

A substantially sharp leading edge on the cutting member allows for increasing the feed rate, and may be configured as an edge having a maximum terminal radius in the range from approximately one-sixteenth inch ($\frac{1}{16}$") to approximately one-eighth inch ($\frac{1}{8}$").

Requiring the blocks to feed through the cutter assembly in response to gravity acting upon the sealant block itself (a gravity feed arrangement), results in a slow cutting process that may provide somewhat marginal benefits. Therefore, the present invention preferably incorporates means for applying a feed pressure against the sealant blocks toward and/or through the heated cutter assembly. The solid sealant blocks in this case are not "melted through" into segments so much as they are "cut through" into segments by a heated cutter assembly through which the blocks are forced in response to a feed pressure. This means for applying feed pressure may also be referred to as a "ram device" and it may be implemented as a movable member, such as a ram plate, configured to move from a first position for receiving solid material, and a second position wherein at least a substantial bulk of the solid material has already been pressed through the cutter assembly. The movable member is connected to a mechanical output driver element that is configured for applying a feed force to urge the movable member from the first position to the second position while feeding a solid sealant block through the cutter assembly.

By way of example, and not of limitation, the movable member may be retained proximal to the heated chamber and disposed between a first position and a second position by a means for applying motive force. In the first position, the movable member provides a sufficient physical separation between the movable member and the cutter assembly to insert a block of solid sealant material. Optionally, a sufficient separation distance can be provided to allow simultaneously loading multiple blocks of solid sealant material between the cutter assembly and ram plate. Once loaded, the movable member (ram plate) drives toward the second position reducing the physical separation between the movable member and cutter assembly and forcing the block(s) through the blades of the cutter assembly. Preferably, the movable member is configured to supply feed pressure against the sealant block until the block is fully segmented by the cutter, such as having been pressed through the cutter assembly. The ram plate, when disposed in the second position, preferably forms a seal against the opening surrounding the cutter assembly over the heated sealant chamber to prevent sealant leakage that may arise from bouncing and vibrations associated with transport of the sealant melter to a work site. In this way, the ram plate performs double duty as both a feed device and a cover for the sealant reservoir.

The motive force applied to the movable member, or members, urging the blocks past the cutter assembly may be supplied by a mechanically actuated element, such as a gravity driven movable member whose additional weight is directed against the solid blocks to aid in driving them through the cutting members. The motive force may be more preferably supplied using any convenient form of mechanical output actuator system, such as a hydraulic, pneumatic, or electrical actuator system.

A loading enclosure preferably surrounds the cutting member (ram device) and the opening into the heated sealant reservoir, so that molten sealant does not escape as a consequence of bubbling and splattering during sealant loading operations. The enclosure preferably incorporates a loading access means, such as a loading door, through which solid sealant material may be introduced into the sealant melter without moving the entire enclosure. Configuring the loading enclosure and ram device with sufficient volume to accommodate the addition of multiple blocks of solid sealant material upon the cutter assembly beneficially allows increasing maximum sealant feed rate at an applicator head while reducing operator overhead associated with the intermittent loading of additional sealant blocks.

A movable portion of the ram device is preferably operated in concert with a loading access means, such as a loading door or doors, within the loading enclosure to increase safety and reduce heat losses from the heated reservoir. The loading door may be configured with an actuator for opening the loading door in response to the position, or motion, of the ram device. For example the actuator may be configured so that the door may only be opened when the ram device is in a position for receiving a new block of solid sealant. In this mode, it is preferred that the ram plate of the ram device be retained in a closed position over the cutter assembly to seal the opening of the heated sealant chamber until new blocks are to be introduced.

Alternatively, or additionally, the loading door(s) may be configured for biased retention in a closed position, such as by utilizing a spring loaded hinge assembly. The doors would preferably have an interlock for preventing the loading door(s) from opening during at least portions of the operating cycle of the ram device. Restricting loading door use during ram device operation can prevent jamming of the system. Jamming may arise, for example, if a sealant block is being loaded through the enclosure door while the ram device is operating, wherein the block and/or loading door may be subject to being struck by the moving ram plate, actuators, or other mechanisms associated with the ram device.

Another beneficial optional aspect of the invention is a pressure sensing means coupled to the ram device that, upon encountering a "non-feed" situation in which ram plate pressure is being applied but the ram plate is not moving, causes the ram plate to be disengaged and/or withdrawn. This form of pressure sensing interlock can also provide for sensing mechanical problems or obstructions within the enclosure. As with other preferred and beneficial aspects of the invention, it is an optional aspect of the invention whose inclusion may not be applicable to every application and mode of operation for the invention.

Additionally, or alternatively, a user control for the ram device can be configured to allow the operator to retract the ram device at any desired time during the ram device operating cycle.

It should be appreciated from the above examples that a number of loading door and ram device activation controls may be implemented for the sealant melter apparatus without departing from the teachings of the present invention.

The present invention may also be configured with an indicator for the position, or operating state, of the ram device to provide valuable information as to whether or not additional solid sealant material may be introduced to the sealant melter at any given time. In addition, an indicator mechanism may be incorporated for gauging the relative volume of molten sealant to provide workers a simple reference indicative of when additional solid sealant blocks may, or should, be introduced to the sealant melter apparatus.

By way of example, these indicators may be implemented as visual indicators wherein a mechanical element is coupled to the ram device or a liquid sealant float for displaying the respective states of the ram device, and/or liquid level, and which may be discerned readily by workers operating the apparatus. Typically, the mechanical indicator would visibly extend from the enclosure for providing visual status information. It should be appreciated that other mechanical, electromechanical, electronic, or combination of means thereof may be utilized for indicating the relative position, or state, of the ram device and liquid sealant levels. Furthermore, additional indicators, such as for liquid temperature, may be included so that workers operating the machine can properly maintain or utilize the machine when sealing pavement surfaces.

The heated sealant chamber of the inventive sealant melter apparatus is configured for attachment of a conduit (hose) for conveying molten sealant material from the reservoir of heated sealant retained in the sealant chamber for application on a pavement surface. An applicator head, such as for filling cracks, or for dispersing the sealant over a wider area, may be connected to the sealant conduit from which it receives the heated liquid sealant material.

Another aspect of the invention comprises a heated hose system having means for heating liquids retained in the interior of the hose. The means for heating liquids may comprise a heating element, preferably electrically operated, although other forms of heating elements may be substituted, and an optional control system for regulating the heat dissipation by the heating element. Alternative forms of heating include (1) circulating a heated flow of liquid, such as oil, through a heating hose retained within the interior of the sealant hose; and (2) providing a recirculation path whereby a limited quantity of heated sealant is bypassed from the applicator head back to the heater when sealant is not being dispensed, or is dispensed at an insufficient rate to maintain a proper sealant temperature within-the hose.

The liquid heating means may be implemented by retaining a heating element within the interior of at least a portion of the lengthwise extent of the hose (liquid sealant conduit). The heated hose may be connected to a heated sealant reservoir of a sealant melter that incorporates the block cutter assembly described above. The heat dissipation from the element is preferably regulated to maintain desired characteristics of the heated sealant material. The heating element is preferably an electrical heating element coupled to a source of electrical power.

The heating element is generally configured as at least one elongated heating element configured for being retained within the fluid passageway through the center of the sealant hose. A two conductor electrical heating element, such as in the form of a loop (portions of the conductive heater loop being intertwined, adjacent, or separated from one another), is preferably utilized wherein electrical connection to the heating element need only be introduced at a single location along the length of the hose, preferably far upstream of the dispensing nozzle. The electrical heater preferably comprises at least one resistive element that converts electrical current passing through the element into thermal energy for heating said sealant fluid passing through said flexible hose. Alternatively, the heating element may be retained between multiple locations within the interior of the hose. For example, the heating element may exit the hose at a first and second location, such as an electrical heating element retained within the interior of the hose between two couplings to which electrical heating power is routed.

The heated sealant hose generally comprises a flexible hose configured for conveying heated sealants between a sealant reservoir and an applicator head, or similar output device. The heated sealant hose is preferably manufactured from a flexible material, or composition of materials, that is substantially impervious to the chemical composition of the liquid sealant material and the maximum temperatures to which the liquefied sealant material may be subjected. The flexible hose is preferably configured having a substantially cylindrical cross-section to reduce material requirements and associated weight for a given length and diameter of flexible hose.

The heating element within the interior of the heated hose comprises an electrical heater disposed within the interior of at least a portion of the flexible hose utilized for conveying the liquid sealants. By way of example, a multiple conductor resistive element may be disposed within the interior passageway of the flexible hose for converting electrical energy received across the heating element into thermal energy for heating the sealant fluid as retained proximal to, or flowing by, the heating element within the heated sealant hose.

The heated sealant hose beneficially includes a means for regulating the heat dissipation by the electrical heater in response to thermal-characteristics of the heated sealants being conveyed through the flexible hose and provides for properly operating the heating element to maintain the liquid sealant at a desired temperature or associated set of thermally-related characteristics. Electrical connections to the heating element may be provided through the walls within a section of hose, or through a coupling attached to the section of hose. Connections made through the walls of the flexible hose may be established by passing from the exterior to the interior of the section of flexible hose. The cross-over location through the wall of the tube into the passageway within the hose is sealed to prevent leakage of hot fluid from the hose or unintended siphoning of air into the hose which can alter the flow of sealants being applied. The cross-over location may be more preferably provided within a coupling attached to the hose, such as on a threaded coupling, wherein electrical connections are passed through the wall of the coupling or integrated as a set of electrical contacts (i.e. negative and positive contacts) for the heating element within the coupling itself.

Heating controls can be beneficially provided utilizing a sensor for registering the temperature, or any thermally related characteristics of the fluid, in combination with a heating regulator that modulates energy dissipation within the heating element in response to the signal generated by the sensor. Typically a temperature sensor, such as a temperature transducer, or thermocouple, would be utilized for providing feedback to control liquid sealant heating. It should be appreciated, however, that other metrics such as sealant flow rate, flow resistance, and viscosity can be alternatively utilized for determining the proper amount of heat energy that is to be applied to the sealant material by the heating controls.

A thermally insulating layer, or over wrap, preferably surrounds the exterior of the flexible hose to limit the loss of heat and to prevent possible burn injuries should unprotected personnel inadvertently contact the exterior of the hose.

Another aspect of the invention is a "pressurized pavement crack sealing head", also referred to herein as an "applicator head", that provides controlled distribution of hot sealants into a crack, or similar area to be filled with liquid sealant. The applicator head generally comprises means for retaining a quantity of liquid sealant material under pressure against a surface being sealed, and means for regulating the flow of liquid sealant for retaining a desired quantity of the liquid sealant in contact with the surface being sealed in response to the rate at which the sealant is being dispensed onto the surface. It will be appreciated that by retaining the liquid sealant at a pressure which exceeds ambient atmospheric pressure levels that the sealant may be beneficially forced into the cracks within the underlying surface.

By way of example and not of limitation, the applicator head may be embodied with a dispensing tube, variable volume sealing chamber, and any convenient means for regulating the flow of sealant in the dispensing tube. The dispensing tube has a distal end configured for connection to a source of liquid sealant material and a proximal end configured for applying sealants to fill a crack(s), voids, or any surface anomalies into which sealant is to be introduced. Typically, the surface being filled is a pavement surface (i.e. asphalt, concrete, asphalt/rubber compositions, and other generally hard contiguous surfaces) such as found on roadways, highways, parking lots, and so forth, although the invention is applicable to sealing a variety of material surfaces. The sealing chamber preferably surrounds the proximal end of the dispensing tube for receiving a quantity of sealants and is configured for retaining a variable volume of sealant in response to applicator needs, application rate, and so forth. The sealing chamber may be implemented by fixedly attaching a compliant section to the sealing chamber, compliantly attaching a rigid structure to the sealing chamber, or by combinations of the above.

The means for regulating the flow of liquid sealant into the dispensing tube is responsive to the volume or pressure of sealant retained in the sealing chamber, wherein a sufficient quantity of sealant is maintained at a sufficient pressure so that cracks may be readily filled from liquid sealant material retained within the sealing chamber. A liquid flow regulator, such as a valve, pump, or similar flow control device may be utilized for regulating the flow of heated sealant through the dispensing tube in response to sealant requirements within the sealant head. Although a variety of flow control devices may be utilized, the term "valve" will be used herein as representative of liquid flow regulators in general.

Furthermore, it is preferable that means of preventing sealant leakage be incorporated into the dispensing tube wherein leakage from the dispensing head is prevented when a column of sealant is retained in the dispensing tube and associated plumbing that is not subject to pump pressure from a sealant pumping device. The means for preventing leakage may be incorporated within the liquid flow regulator, such as by biasing a flow valve to "check" (prevent) fluid leakage, wherein fluid may only flow when subjected to above "standing pressure" levels. Alternatively, means for providing a countering vacuum pressure could be employed separately or in combination with a checking valve or device. A separate check valve may also be utilized within, or coupled to, the dispensing tube to prevent leakage from the dispensing tube onto the surface being filled. This last option is generally represented in the preferred embodiment of the invention, as it can be easily implemented while preventing leakage near the dispensing apertures of the dispensing head.

A contact ring preferably surrounds the lower portion of the sealing chamber for maintaining a seal against the pavement surface through which sealant may be forced into the pavement cracks. The contact ring also provides a squeegee mechanism that can shape the sealant applied over the crack, such as creating what is generally referred to as an "overband configuration", or any other desired sealant shape. Although a contact ring can provide a number of benefits, it should be appreciated that it is generally optional and need not be implemented for every embodiment and application of the present dispensing head invention.

The function of the contact ring is directed toward providing a compliant seal against the pavement surface. The compliance of the contact ring increases the ability of the contact ring to provide a seal against irregular pavement surfaces and the varying distances that separate the pavement surface and the applicator during crack sealing operations. The contact ring is preferably coupled to the sealing chamber for providing, or enhancing, the sealing capabilities of the sealing chamber against the pavement surface. The contact ring provides for, or enhances, the seal between the sealing chamber and the underlying surface being filled, by providing a surface that can smoothly interface with the underlying pavement surface.

It should be appreciated that contact ring compliance within the present invention may be attained using structure, materials, or a combination thereof. By way of example, the contact ring utilized within the present invention may be compliantly coupled to the sealing chamber, wherein the contact ring, or portions thereof, are capable of moving in relation to the position of the sealing chamber. The contact ring may comprise a compliant or semi-compliant material, (i.e. rubber, latex, silicone, brushes, UHMWPE, and similar polymers or other materials). Alternatively, a compliant contact ring, such as made of a compliant material (i.e. rubber, silicone, or similarly compliant material), extending segments, or brushes, which may be fixedly attached to the sealing chamber and configured to provide sufficient material compliance to maintain a proper pavement seal. The contact ring is preferably configured for being rotated when in contact with the pavement surface to maintain substantially even wear on the contact ring from all directions.

A float member, such as a cylinder, retained within an opening of the sealing chamber is configured to maintain a selected pressure, or volume of sealant, within the sealing chamber. The sealing chamber and float are preferably configured as cylindrical sections, although other nested shapes may be utilized for retaining the heated sealant. Means for responding to sealing chamber pressure or volume is preferably provided to allow the capacity and pressure of the sealing chamber to be both registered and modified. The pressure and volume adjusting mechanism of the sealing chamber is configured to move in response to the flow rate of liquid sealant from the dispensing tube into the sealing chamber less the amount of liquid sealant being applied to cracks being filled beneath the dispensing tube and attached sealing chamber. A fluid flow controller may be utilized as a means of responding to sealing chamber volume or pressure changes in response to the flow of liquid sealant from the dispensing tube into the sealing chamber.

By way of example, the volume of the sealant chamber may change in response to the pressure applied by the sealant dispensed from the dispensing tube. This means of volume response may be implemented by biasing a volume compliant sealing chamber toward a low sealant volume, for example wherein the volume of the sealing chamber can be increased in response to increased sealant pressure, or decreased in response to decreased sealant pressure. The sealing chamber may be biased toward a low volume by biasing the float cylinder toward a reduced sealing chamber volume. One simple biasing means, by way of example, is the use of spring members to constrain sealing chamber volume, although numerous alternative forms of biasing may be utilized without departing from the teachings of the present invention.

Active methods of controlling sealing chamber volume or pressure may also be utilized, such as by coupling an actuator (i.e. mechanical, electrical, hydraulic, pneumatic, and so forth) to the float cylinder. Float position in this case is modulated directly, such as by an actuator, to maintain a desired volume and/or pressure of sealant in response to the relationships between the input flow rate of sealant into the dispensing head and sealant application rate.

It should be appreciated that the pressure of the sealant retained in the sealant chamber, or applied against the float cylinder, may be registered within the system. Pressure sensors may be coupled to the interior of the sealing chamber to register the pressure applied to the sealant. Alternatively, or in addition, the volume of the sealing chamber may be determined, such as by registering the position of the float cylinder or its motion with respect to a known position.

It should also be appreciated that as sealant material is applied to the roadway, the pressure within the sealing chamber would normally drop unless an equal volume of material is being input into the sealing chamber or the sealing chamber volume is accordingly decreased. By way of example, the flow rate of molten sealant into the dispensing tube during crack filling operations can be maintained at a level above the average sealant outflow level, but not as high as peak flow requirements. The sealant is then applied from the filled sealant chamber under pressure with higher flow demand peaks depleting the reservoir in the float cylinder in response to the demand in order to maintain the desired application pressure. During periods of relatively low demand, the sealant chamber refills to a desired nominal capacity. If low demand continues, then as the chamber fills, the sealant flow into the sealant chamber is reduced and then finally stopped.

It is beneficial for the electronic controls of the system to be configured for modulating sealant flow into the sealing chamber to maintain proper application pressure and assure that adequate supplies of sealant are available during crack filling operations. During pavement maintenance operations, when one crack has been filled, the sealing chamber may be moved to a nearby crack, while remaining in sealed contact with the pavement surface, wherein it may continue filling this additional crack.

It may be desirable to minimize the amount of sealant material retained in the sealing chamber before moving to a new crack, so as to reduce sealant waste and unnecessary marking of the pavement surface with small residues of sealant. Mechanisms for minimizing sealant loss may be particularly beneficial in situations in which the sealant head is to be lifted from the pavement, such as to facilitate moving to a new location on the pavement. In this case the level of sealant retained within the sealant chamber and dispensing tube should be minimized according to a mode of the invention to reduce or eliminate spilling of the sealant as the seal of the sealing chamber with the pavement surface is broken and the sealing chamber is vertically displaced. For example, as the terminating end of a crack is approached that will require raising the applicator head before moving to another crack, then sealant flow into the sealing chamber may be discontinued at an appropriate time so that the reservoir of sealant in the sealing chamber will be at least substantially depleted prior to the sealing chamber being raised and moved. The system can be configured for reversing the sealant pump momentarily prior to raising the sealing chamber from the surface to draw sealant back toward the sealant melter. It should be recognized that the flow of sealant into the dispensing tube can be limited to a given application pressure, or its flow rate or pressure may be modulated by an electrical controller for the system. Sealant is preferably admitted to the sealing chamber generally according to an inverse relationship with the volume of liquid sealant retained in the sealing chamber.

It will be recognized that discontinuing sealant flow prior to reaching the end of a crack being filled requires estimating the length of the crack and preferably estimating its fill capacity as the terminus of the crack is approached. On an automated application system the detectors for determining the location of the crack can perform a look-ahead function, wherein information is made available for determining the remaining unfilled crack length and characteristics of the crack, such as width, depth, path, and so forth. Registering the metrics of the running crack allows the system to estimate crack capacity and control an appropriate amount of sealant for retention within the dispensing tube and associated sealing chamber.

For example, the crack capacity may be estimated by assuming a given taper profile in relation to the shape and registered metrics of the crack from the present value of material usage rate. The present sealant usage rate is readily tracked by taking into account the incoming flow rate and the chamber volume changes with respect to the distance that the applicator head moves when filling the crack. Overall, it should be appreciated that retaining a ready reservoir of sealant at the interface with the pavement allows cracks of any capacity profile to be pressure filled with sealant without the need to alter the speed of application, or the need to rapidly modulate sealant flow rates while filling along the span of a crack, or cracks.

By maintaining a reservoir of heated sealant material against the pavement surface, the apparatus can fill cracks more readily than conventional dispensing heads. The invention overcomes the problems associated with filling a crack whose fill capacity changes along its span. It will be appreciated that in filling a typical crack, which is subject to fill capacity variation along its length, the utilization of a conventional crack sealing head requires that either the application speed or volume output must be varied in response to the changing volume of the area to be filled along the span of the crack. In contrast, the reservoir retained near the pavement surface within the present invention accommodates capacity variation without the need to quickly modulate application speed or flow rate in response to crack capacity. Furthermore, the pressure supplied by the present invention upon the liquid sealant material drives the material into the crack being filled to improve both sealing efficiency and retention of the sealant material within the crack.

The dispensing tube leading into the sealing chamber may be insulated and/or heated to maintain sealant temperature as it passes through the dispensing tube. The dispensing tube may be heated in a number of ways, such as by electrical heating or the passage of hot fluids through heating chambers within the dispensing tube. By way of example, the dispensing tube may be heated by circulating a hot fluid, such as a heated oil having a temperature in excess of the desired liquid sealant temperature, through passages in the dispensing tube. The oil may be circulated by passing it through an input coupling connected to at least one passageway that routes the hot oil along at least a portion of the length of the dispensing tube and then routes the oil through an output coupling wherein the hot fluid is returned to the heated source of hot fluid.

Means for preventing unrestricted sealant flow is preferably provided to limit unnecessary sealant discharges from the applicator head. By way of example and not of limitation, the means for preventing unrestricted flow can be implemented as a check valve incorporated within the dispensing tube to "check" (limit) the flow of sealant in response to the applied pressure of sealant and/or the distance from the head of the dispensing tube and the underlying surface. The pressure limitation, for example, applies to situations in which the dispensing pump is not operating, or sealant flow valves are shut off, or the pressure applied to the sealant is otherwise below a predetermined cut-off threshold setting. The check valve may be embodied as a spring driven valve, wherein the spring provides a bias force sufficient for biasing the valve into a closed position when subjected to a pressure that does not sufficiently exceed a "standing level" of fluid pressure, such as associated with a standby mode of the system in which no sealant material is to be dispensed for crack filling. As used herein, the weight of a standing column of liquid sealant within the dispensing tube, hoses, and remainder of the system when not being driven by a dispensing pump is considered a "standing level" of sealant fluid pressure. Typically, the operational sealant dispensing pressure is at least 2 PSI, and generally between 2 PSI and 30 PSI, greater than the standby sealant pressure. Operational sealant dispensing pressure is that which arises when a dispensing pump is activated, such as while a crack is being filled with sealant. Therefore, the valve is preferably configured to open when subjected to a pressure sufficiently in excess of the "standby" pressure as arises when the dispensing pump is activated for applying sealants. It should be appreciated that the present invention can be configured to modulate sealant pressure from the dispensing pump over a range of pressures in response to sealant flow requirements at the applicator head.

The contact ring may be fixedly mounted to the sealing chamber, or an intermediary structure such as a rotatable housing or collar, or it may be compliantly attached and biased toward contact with the pavement surface. The contact ring may be implemented using a compliant structure or material that is fixedly joined to the sealing chamber, or a substantially rigid structure that is movably joined to the chamber and biased away from the chamber, or combinations thereof. The contact ring in this configuration preferably comprises a single contiguous material, such as an abrasion resistant polymer (i.e. UHMWPE—ultra-high molecular weight polyethylene, rubber, silicone, and so forth) or similar material. The contact ring may also be fabricated from compliant or brush-like (bristles, fingers, or otherwise segmented contact ring) structures, or it may be configured with compliant or brush-like structures attached to a lower portion of the contact ring to enhance the seal with the underlying pavement. Compliant or brush-like materials may be joined to the lower portion of the ring may be configured with individual compliant segments, or bristles. Furthermore, the contact ring may be formed having a sufficient width of material adjacent to the surface being sealed to operate as a squeegee upon passing over the sealant that has been dispensed into a filled crack.

By way of example, the contact ring may be implemented as a slidably engaged contact ring biased toward engagement with the underlying pavement surface, such as driven by gravity, a mechanical biasing member, an actuator, or by a sealant pressure driven device. A sufficiently compliant contact ring, such as in the case of rubber, compliant polymers, a brush, or the like, can eliminate the need for providing biased slidable engagement between the contact ring and the sealing chamber. By way of further example, the contact ring may comprise a compliant ring or brush fixedly attached to the sealing chamber, wherein the compliance of the material provides the necessary shape adaptation for sealing against the underlying surface. An advantage of a biased engagement of the contact ring with the pavement surface is that the contact ring can provide a fixed pressure against the pavement wherein seal integrity and long contact ring service life are more readily attained despite minor pavement shape and position fluctuations. It will be appreciated that the dispensing nozzle is retained at, or a small given distance from, the pavement surface wherein even small amounts of wear occurring on a fixed contact ring surrounding the dispensing nozzle would prevent a proper seal with the underlying surface.

A means for modulating the position of the sealant chamber is optionally provided to equalize wear on the lower surface of the sealing chamber, and/or contact ring, arising from contact with the underlying pavement surface. The position may be modulated by tilting or rotating the chamber, and/or contact ring, to assure equalized wear.

A preferred mechanism for equalizing wear involves rotating the sealing chamber and/or contact ring. For example, the contact ring itself, which may be coupled with an intermediary structure or the entire dispensing tube and sealing chamber, may be configured for rotation. In one mode, the contact ring can be rotated in combination with the attached sealing chamber and dispensing tube. The means for modulating the position of the sealant chamber may be implemented with a rotational coupling attached to the dispensing tube, and a rotational drive actuator configured for engaging the rotational coupling to rotate the angular position of the dispensing tube and attached sealant chamber and contact ring. In an alternative rotation mode of the invention, the contact ring may be attached to a rotatable housing, or collar, which surrounds a fixed sealing chamber. In this case the contact ring and rotatable housing are driven by a mechanical output device while the sealing chamber and dispensing tube remain stationary.

As described above, the lower exterior of the sealing chamber, or contact ring, provides a seal in contact with the underlying pavement surface.

The substantially sealed reservoir of hot liquid sealant may be maintained at a sufficient sealant pressure to allow sealant to be forced under pressure from the sealing chamber to provide for pressurized filling of cracks. A number of benefits are derived from forcing sealant into the cracks, including the following. (1) The crack filling process is sped up as gravity is not relied upon for driving the sealant material into the depth of the crack. (2) The liquid sealant is forced into the recesses of the crack providing an improved water seal and improved sealant retention. (3) As the sealant more readily fills the crack, there is less time for heat losses to arise that increase sealant viscosity and reduce wetted surface contact between the dispensed liquid sealant and the walls of the crack being filled, thereby improving sealing and sealant retention.

It will be appreciated that the sealing chamber, and contact ring if applicable, are filled with sealant from the dispensing tube to maintain a volume of liquid sealant at a pressure which exceeds the ambient pressure. A means for regulating the flow of liquid sealant into the sealing chamber is provided such as comprising a feedback sensor for detecting the amount of sealant within the sealing chamber, in combination with a flow control circuit which meters sealant flow to the sealing chamber in response to the signal from the feedback sensor. The flow control circuit may control the flow of sealant by regulating at least one valve mechanism, pump device, or combination thereof as will be known to one of ordinary skill in the art.

A sealing chamber having a compliant volume may be implemented in a number of alternative ways according to the invention. For example, a movable float cylinder may be retained within a sealing chamber to substantially seal the upper end of the sealing chamber and its position may be adjusted to modulate the amount of sealant retained in the sealing chamber and the pressure being applied on the sealant within the sealing chamber. The position of the float cylinder, and/or pressure applied thereto, may be detected from a feedback sensor detecting the amount of sealant and/or pressure retained in the sealing chamber. In response to volume or pressure, the position of the float cylinder may be adjusted by way of an actuator, such as a pneumatic cylinder, to control the application pressure and amount of sealant retained within the sealing chamber.

It will be appreciated that cracks may be cleaned or otherwise dressed as desired prior to being filled with the liquid sealant. For example, a rotary scarfing operation may be performed to flatten the top surface of the pavement and clean loose material from the crack prior to filling with the sealant material. As another example, a fluid such as air or a liquid may be directed into the crack to clean it prior to sealant application. In a contrasting example, material such as sand may be dispensed into large cracks before filling them, wherein the amount of liquid sealant required to fill the crack is reduced. Automated crack sealing equipment utilizing the dispensing head of the present invention, therefore, may be optionally configured to automatically perform these and other forms of pavement crack preparation without departing from the teachings of the present invention.

A translation stage coupled to the dispensing tube and adjoining the sealing chamber can provide for beneficially adjusting their positions in relation to changes in the position of the pavement surface being filled. The translation stage may be adjusted in the vertical direction to accommodate changes in the vertical displacement of the pavement surface being filled. Optionally, the translation stage may allow for adjusting position in the horizontal plane to aid in following a crack being filled. The operations may be controlled manually or regulated by an automated control system which registers information about the pavement surface, and surface conditions, such as cracks thereupon, from which it controls the movements and dispensing of sealants from the sealant head.

The block cutter, heated hose, and applicator head aspects of the present invention may be utilized separately or may be beneficially combined in a variety of ways for heating sealants and facilitating their application, such as to pavement cracks within a manual, semi-automatic, or automatic process.

The present invention allows for increasing the rate at which heated sealants may be liquefied and applied, and for increasing the resultant seal and retention force provided by the solidified sealant within the crack being filled. A number of advantages are provided by the present invention, including the following.

An object of the invention is to provide an apparatus for dispensing hot sealants onto pavement surfaces while reducing the time required for performing the sealing operation.

Another object of the invention is to provide a cutting head for rapidly severing solid blocks of sealant material into smaller sections that speed melting of the sealant within a heated melting chamber.

Another object of the invention is to provide an enclosure surrounding a cutter assembly for preventing heat losses and molten sealant losses.

Another object of the invention is to provide a loading door within an enclosure that provides for controlled introduction of solid sealant blocks into the apparatus in response to the position of the cutting head and the current liquid level in the reservoir.

Another object of the invention is to provide a heated hose in which the sealant temperature may be maintained as it traverses along the length of the hose toward being dispensed at the sealant applicator head.

Another object of the invention is to provide a sealant applicator head that is capable of applying heated sealant under a pressure which exceeds ambient pressure, for better sealing and improved retention when filling cracks and other surface voids.

Another object of the invention is to provide a sealant applicator head that is capable of adjusting to varying sealant fill capacities.

Another object of the invention is to provide a sealant applicator head that is capable of filling cracks or other surface aberrations with liquid sealant material to a level that is substantially flush with the surrounding unfilled surface.

Further aspects, objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 2 is a top view of a solid sealant cutter assembly according to an aspect of the present invention, shown with a sealant block engaged upon a plurality of cutting edges.

FIG. 3 is a side view of a block cutting blade, such as removed from the cutter assembly of FIG. 2.

FIG. 4 is a side view of a heated cutting blade according to an aspect of the present invention, shown with a heating element retained within a cutting blade attached to a reinforced body.

FIG. 5 is an end view of the heated cutting blade shown in FIG. 4.

DETAILED DESCRIPTION OF THE INVENTION

Referring more specifically to the drawings, for illustrative purposes the present invention is embodied in the apparatus generally shown in FIG. 1 through FIG. 19. It will be appreciated that the apparatus may vary as to configuration and as to details of the parts, and that the method may vary as to the specific steps and sequence, without departing from the basic concepts as disclosed herein.

A number of aspects are described for the invention to speed and simplify the process of applying heated sealants, such as to cracks in pavement surfaces or similar fill applications. These aspects of the invention are primarily directed toward: (1) reducing the block size of a hardened sealant material prior to it entering a heated reservoir of molten sealant to speed liquefaction, (2) transferring heated sealant to an applicator, and (3) applying liquid sealant under pressure to a crack in a surface which is to be filled.

Figure 1:
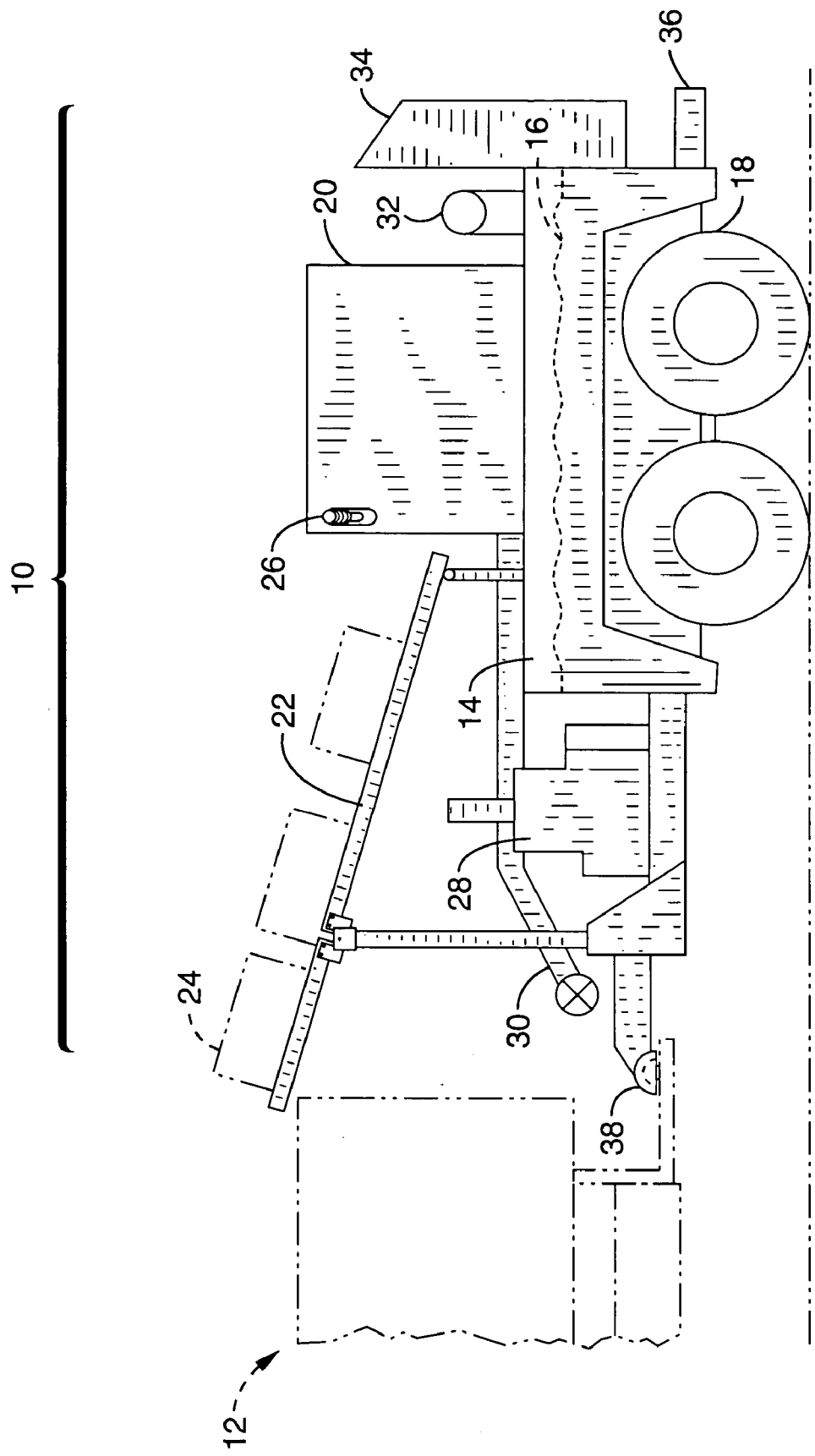
FIG. 1 is a side view of a sealant melter configured according to an embodiment of the present invention shown for melting and dispensing heated sealants from a mobile platform.

FIG. 1 depicts a portable sealant dispensing apparatus 10 according to an embodiment of the invention. In FIG. 1, the apparatus is configured as a towable trailer for melting and dispensing heated sealants from a mobile platform. By way of example, the apparatus is shown hitched to a truck 12 for carrying the solid sealant material and other necessary supplies. A heated sealant chamber 14 is provided for retaining a quantity of molten sealant material 16. Wheels 18 or other physical transport mechanisms are preferably provided to allow transporting of the material to a work site.

To prevent displacement of the molten sealant material during transport and use, an enclosure 20 is provided to surround an opening within sealant melter 14 into which solid blocks of sealant material may be introduced. A loading ramp 22 is depicted between the apparatus and truck 12 allowing blocks of sealant 24 (shown in phantom) from within the bed of truck 12 to be easily moved in preparation for loading into heated sealant chamber 14. The loading door through enclosure 20 (not shown) is controlled by a loading door control 26 shown extending from the enclosure. It will be appreciated that controlling the operation of a loading door into enclosure 20 may be performed using a number of different mechanisms without departing from the teachings of the present invention.

A sealant pump 28 is configured with molten sealant conveyance pipe 30 for dispensing molten sealant 16 from heated sealant chamber 14 toward the applicator head (not shown) being used in the specific application. The heater for sealant chamber 14 is not shown, although it typically operates from a combustion process, such as from burning a compressed natural gas or similar. Furthermore, the inclusion of a recirculator, or agitator, can provide better temperature equalization while preventing stratification of the material within heated sealant chamber 14. By way of example, sealant melter chamber 14 is shown with a vent 32 for equalizing pressure with the ambient environment. The mobile sealant melter is optionally shown with a combination barrier and traffic alert icon 34, a conventional bumper 36, and a hitch 38 to facilitate mobility.

The sealant material in use is typically a hot applied modified polymer sealant which must be melted from a block of solidified sealant material into a liquid material so that it may be applied to a pavement surface, upon which it quickly solidifies to provide a tough weather seal. A typical temperature of over 300° F. is maintained for the molten sealant material in melter chamber 14. Sealant melters are generally configured to retain a volume of from two hundred to four hundred gallons of liquid sealant material. Each block of sealant typically weighs approximately twenty to fifty pounds and comprises a cylindrical cardboard tube, or polygonal cardboard tube, that is filled with molten sealant and cooled to form each solidified block of sealant.

One common application for a sealant melter is in the filling of pavement cracks, such as in a roadway surface comprising concrete, asphalt or similar surface compositions. During crack sealing operations the heated sealant chamber 14 is retained at a sufficient temperature for a sufficient period of time to allow the sealant material contained therein to be liquefied and brought to the desired application temperature. As the sealant is dispensed, such as into a crack sealing head, the liquid sealant within heated sealant chamber 14 is depleted, requiring the loading of additional blocks of solid sealant material into the heated sealant chamber to maintain the desired level of liquid sealant. It will be readily appreciated that dispensing the sealant at a flow rate that exceeds the rate at which solid sealant may be melted and brought to the correct temperature will deplete the liquid sealant and require halting the work being performed.

FIG. 2 through FIG. 5 depict aspects of a block cutter assembly 40 which is retained within enclosure 20 of sealant dispensing apparatus 10. Solid blocks of material may be fed through block cutter assembly 40 under gravity feed, or more preferably in combination with a means for applying a feed pressure to the solid blocks of material to speed the cutting operation and solid introduction rate into the sealant melter. FIG. 2 exemplifies block cutter assembly 40 that provides for increasing the rate at which solid blocks of sealant material may be liquefied. The block cutter assembly provides a means for severing received blocks 24 into smaller pieces, such as segments, and may also be referred to as a shredder. Block cutter assembly 40 reduces the block size of solid sealant materials utilized for pavement crack sealing and similar processes in which heated sealant are dispensed from heated sealant chamber 14. Supports 42a, 42b are shown for supporting a series of cutting members 44, which are also referred to herein as heated cutting blades.

FIG. 3 depicts a cutting member 44 shown with a longitudinal support 46 over which a cutting edge 48 with leading edge 50 is retained, such as by fastening means 52 (i.e. rivets, screws, or similar fasteners).

FIG. 4 and FIG. 5 show details of an embodiment of cutting member 44, with heating element 54 retained beneath cutting edge 48. A thermally conductive material 56 is depicted as being used to fill the gaps between heating element 54 and cutting edge 48.

Alternatively, the heated cutting edge may be implemented to have some thermal isolation from longitudinal support 46, wherein heating element 54 and cutting member 44 temperatures may be maintained above that of support 46, while conductive heating losses may be reduced. This may be readily implemented by incorporating an insulating member or material between the combination of heating element 54 and cutting edges 48 and longitudinal support 46.

Additionally, it will be appreciated that the surface of cutting edge 48 may be configured with small raised structures, or reliefs, (not shown) so as to prevent unwanted adhesion between severed sections of the block and the cutting edges. By way of example the structures may be implemented having a difference between the peaks and valleys of up to about one-tenth of an inch (0.1").

Cutting edges 48 are exemplified with substantially sharp leading edges 50, upon which the solid block first makes contact when being cut by cutter assembly 40. The leading edge 50 of cutting members 44 should typically be configured with a terminal radius not to exceed approximately one-half inch (½"). Very sharp leading edges, such as having a radius less than the material thickness, such as one sixteenth inch (1/16"), can reduce structural integrity or require more expensive fabrication techniques, such as molding and/or machining processes which are more costly than sheet metal bending fabrication processes. For a bent sheet metal leading edge 50, it is more preferred that the leading edge radius be approximately one-sixteenth inch (1/16") to one eighth inch (⅛").

Although depicted as rectilinear elements, block cutter assembly 40 may be configured with a recessed center portion to assure that during ram plate operation, the blocks being severed do not apply pressure to the sides of the enclosure 20. By way of example, cutting members 44, along with associated heating element 54 retained beneath cutting edge 48, may form a curved section wherein upon the application of ram plate pressure the blocks are driven toward the center of block cutter 40. Alternatively, sloping sides may extend about the periphery of linear cutting elements to otherwise prevent blocks from being forcibly pressed against enclosure 20.

Conductive wiring 58 is shown connecting to heating element 54, although it should be appreciated that the electrical connection may be provided in response to a physical connection of the heating element to longitudinal supports 46, or similar retention structures. For example, the heating elements may be adapted for bolting into supports 46 wherein the bolts are configured for providing the electrical connections, such as at least one polarity of connection at each end being insulated from the conductive frame.

By way of example, longitudinal support 46 may comprise a steel body having a first cross section 60 retained substantially perpendicular to the direction of block travel and a second cross section 62 retained substantially parallel to the direction of block motion through the cutters. Although shown as a solid section of material, longitudinal support 46 may be fabricated with a hollow core, such as comprising a bent sheet metal exterior, or shaped in any of various ways to provide support for cutting edge 48. First cross section 60 is preferably substantially narrower than second cross section 62, thereby allowing blocks to be fed through the block cutter assembly with limited cutting resistance while providing adequate physical support for the cutting edges thereby preventing deformations in response to the weight and pressure applied by sealant blocks 24 against cutting assembly 40.

A source of electrical power is considered to be provided as an external power source (not shown), such as from truck 14, or a power source associated with mobile sealant dispensing apparatus 10. Any convenient source of electrical power may be utilized to power aspects of sealant dispensing apparatus 10, for example a battery source, or a combination of battery source and electrical power generation means, such as may comprise a combustion engine driving a generator, a fuel cell, or any convenient electrical power source.

For cutting the solid blocks of sealant into smaller sections, each heating element 54 within cutting member 44 of block cutter assembly 40 is heated, preferably electrically, to a temperature in the vicinity of the melting point of the solid material. It will be appreciated that maintaining temperatures above the melting point can facilitate cutting speed, although temperatures too far in excess of the melting temperature should be avoided as this can lead to undesired chemical changes within the material as well as scorching or even combustion of material film residues left on cutting blades. Any convenient form of sensor and heater control circuit (not shown) may be utilized for regulating the power being supplied to heating element 54 in response to the temperature of block cutting assembly 40.

By way of example, at least one thermocouple may be retained proximal to one or more cutting members 44 for registering the temperature of cutting edge 48 and providing feedback to a heater control circuit. It should be appreciated that utilizing multiple temperature sensors within cutting members 44 can reduce the consequences of failure of a single sensor element and can provide for more accurate temperature control of cutting assembly 40. A control circuit connected to the thermocouples generates a heating current through heating elements 54. In a preferred mode of the invention the average current through heating elements 54 is substantially proportional to the difference in temperature between the actual temperature and a reference threshold corresponding to a temperature setting. The reference threshold preferably being either user selectable within at least a small range of temperatures, or regulated in response to other measured characteristics, such as sealant demand, liquid sealant level, liquid sealant temperature, and other characteristics of the system and combinations of characteristics thereof.

Methods may be employed to provide temperature equalization across a number of cutting members 44. For example, the controller may drive a level of current through the heating elements in response to feedback from the temperature sensor wherein elements in contact with material being cut, which have a higher heat loss and lower resistance, dissipate more power than elements not subject to thermal loading. By way of example, the resistance of the heating element may be thermally responsive, or the control circuit implemented to generate the desired higher levels of dissipation in the cutting members subjected to higher thermal loads. It should be appreciated that various heater control circuits and methodologies are generally well known to those of ordinary skill in heater control design.

It should also be appreciated that heating element 54 may be implemented utilizing other forms of heating mechanisms. By way of example, cutting member 44 may incorporate a heated channel, or channels, through which a heated liquid is passed that maintains a temperature above the melting point of the solid material. Temperature of the blades may be controlled by regulating liquid flow between the blades, such as by incorporating a liquid bypass port that begins to direct sealant flow so that it bypasses the blades as the threshold temperature for the blades is being reached. The bypass control may operate in a manner similar to a thermostat utilized within conventional water-cooled internal combustion engines, such as within a motor vehicle, wherein a thermal regulator, such as utilizing a bimetallic sense element, is configured to activate when a temperature threshold is reached wherein it bypasses liquid flow. In the present application the thermostat can bypass the flow of hot oil, or other heated liquid, away from the cutting blades. A number of alternative cutting member heating implementations may be similarly created without departing from the teachings of the present invention.

Figure 6:
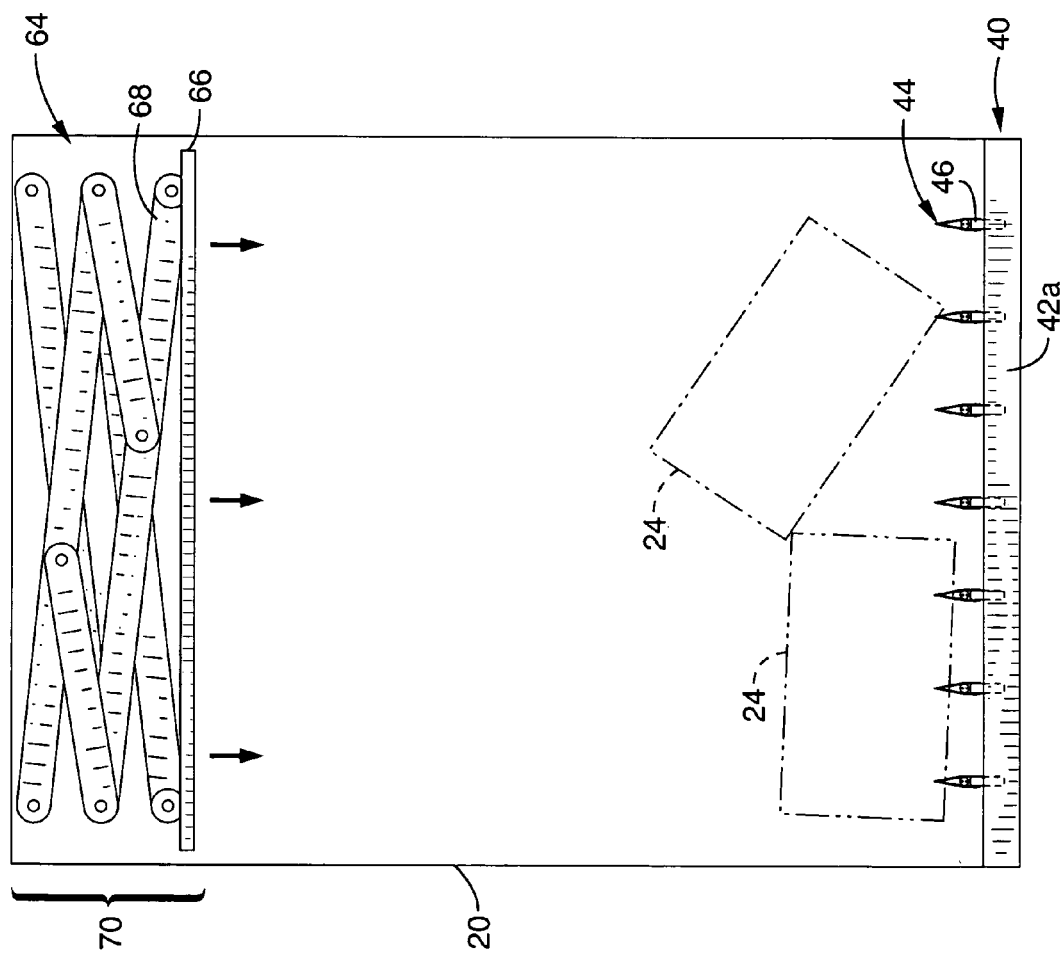
FIG. 6 is a partial cross-section view of a solid sealant cutter assembly according to an aspect of the present invention, showing sealant blocks loaded within the enclosure prior to activation of a scissor-driven ram device.
Figure 7:
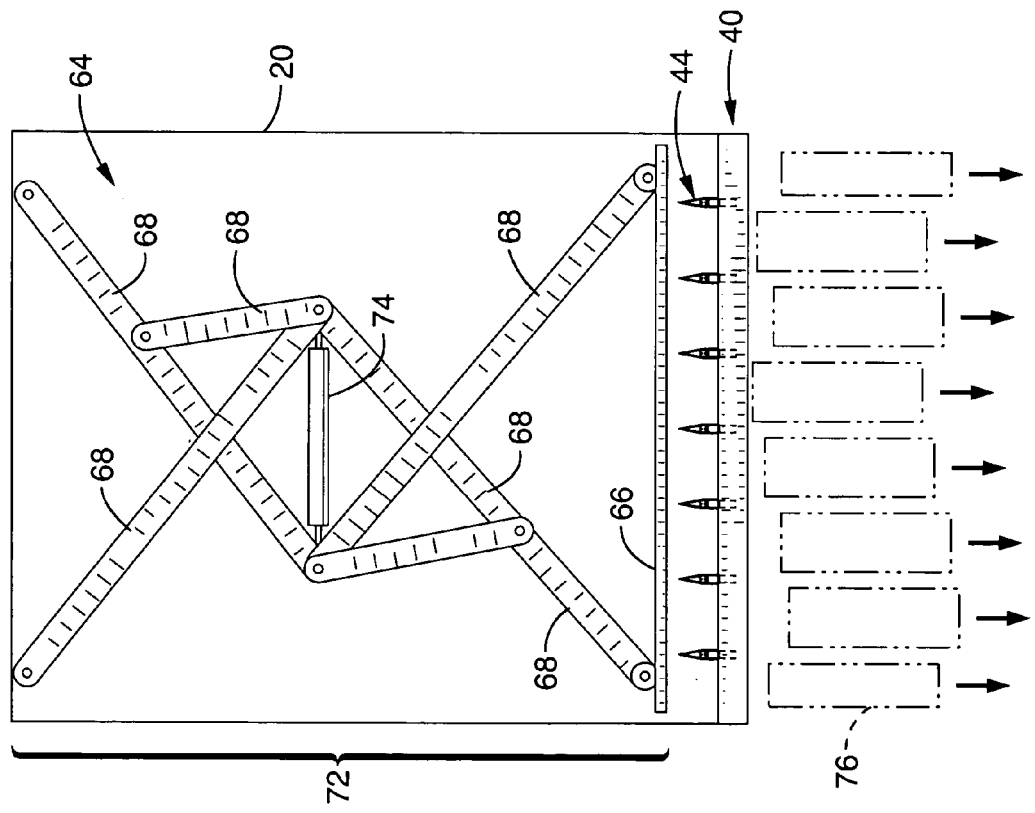
FIG. 7 is a partial cross-section view of a solid sealant cutter assembly according to an aspect of the present invention, showing sealant block segments having passed through the cutter assembly in response to the extension of the ram device of FIG. 6.
Figure 8:
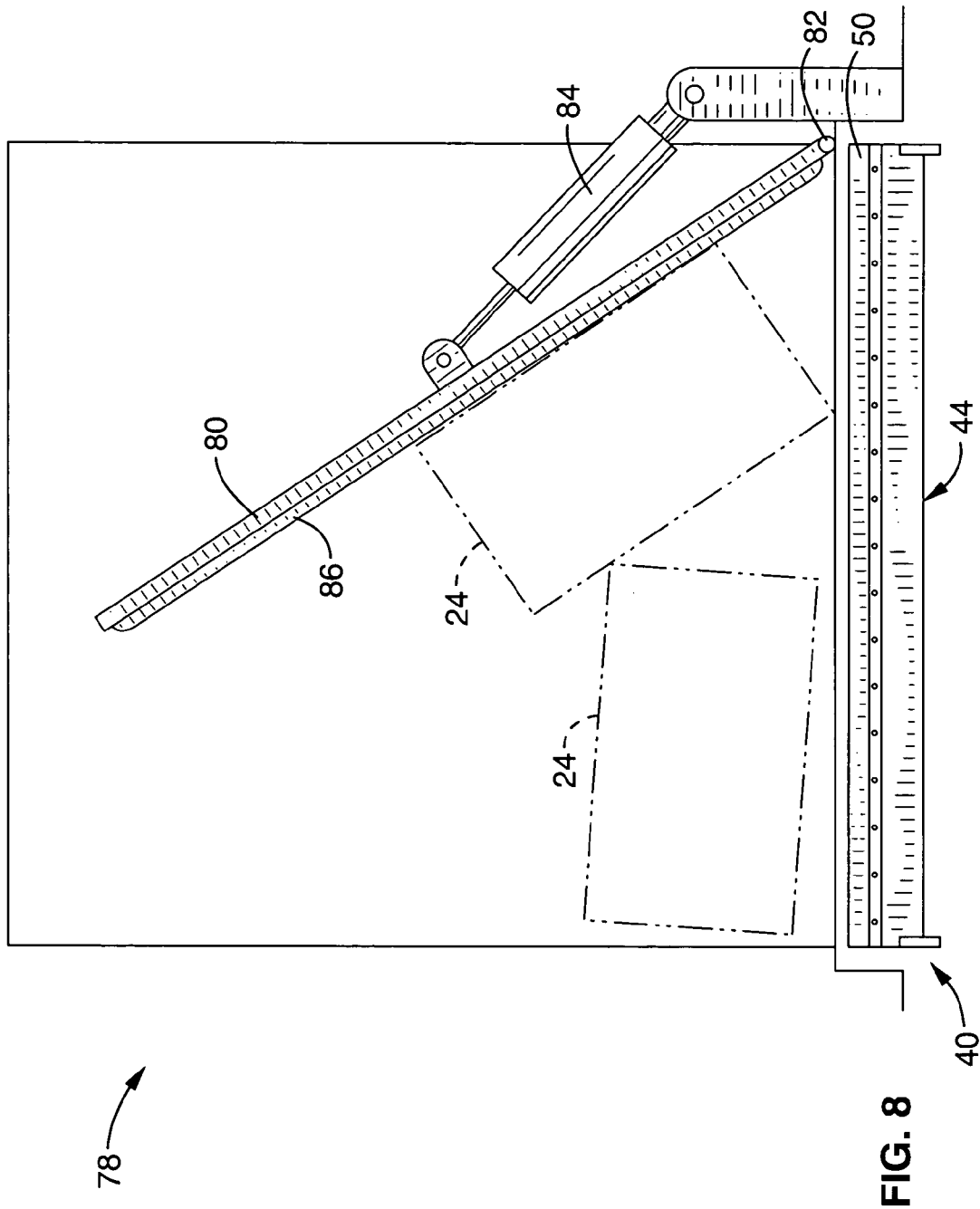
FIG. 8 is a partial cross-section view of a solid sealant cutter assembly according to an aspect of the present invention, showing sealant blocks prepared for being driven by a swing style ram plate through the cutter assembly.

FIG. 6 through FIG. 8 depict embodiments of a means for applying a feed pressure 64 to solid blocks of sealant material 24 against cutter assembly 40. The means for applying a feed pressure is exemplified as being provided by a movable member 66 driven by a means to provide a motive force, such as hydraulic actuators, electrical actuators, or mechanical actuators. Enclosure 20 can be fabricated of a sufficient volume to accommodate the introduction of multiple blocks of sealant 24 which consequently reduce the frequency of work interruptions required for the loading of additional sealant blocks.

Blocks of solid sealant material 24 loaded onto cutter assembly 40 under the influence of gravity alone will be eventually cut by cutter assembly 40, wherein they will drop into the reservoir of molten sealant retained in sealant chamber 14. However, it should be appreciated that the unaided cutting process is characteristically slow, wherein it is preferred that the cutter assembly be utilized in combination with a means for applying a feed pressure. Feed pressure application against the solid sealant blocks toward the cutter assembly may be supplied using a variety of mechanical implementations, a few being embodied herein by way of example and not of limitation.

FIG. 6 and FIG. 7 exemplify a solid sealant cutter assembly 40 over which a ram device 64 utilizing a movable member as a ram plate 66 is being driven by mechanical linkages 68 arranged in a scissor-like arrangement. Ram plate 66 is retained parallel to cutting members 44 while being driven to apply pressure to the solid blocks of sealant material. FIG. 6 depicts the ram device in a retracted position 70, while FIG. 7 depicts extended position 72.

In extended position 72, ram plate 66 preferably seals the opening of sealant chamber 14 SO that sealant is contained within the melter despite attitude changes such as may arise if the melter were to overturn, or be otherwise upset during transit or at a work site. Furthermore, it is required by law that the liquid containment chamber be substantially sealed. Although a continuously open loading aperture may be provided within the enclosure through which blocks of sealant may be introduced for melting, it will be appreciated that heat would be lost and that molten sealant could splash, or splatter as the blocks are cut and drop into the liquid sealant. It is generally preferred, therefore, that a loading door or similar aperture, be utilized which is responsive to the positioning of ram device 64.

The motive power for driving ram device 64 is provided by an actuator 74, such as a hydraulic or pneumatic cylinder, mechanical takeoff (i.e. from an engine that may also drive electrical power generation), or an electrical actuator (i.e. motor with a linear screw shaft drive). It will be appreciated that blocks of solid sealant may be loaded into enclosure 20 when ram device 64 is retracted 70, insofar as sufficient clearance exists between ram plate 66 and block cutter assembly 40. As ram plate 66 extends toward the cutting blades within the housing, blocks of solid sealant material are engaged and feed pressure is applied upon the blocks against cutter assembly 40. As a result, the blocks of sealant will be severed into individual segments 76 which are released into the reservoir of molten material within heated chamber 14.

Although movable member, ram plate 66, is depicted as a simple flat plate for pressing against the blocks of solid sealant, the present invention contemplates configuring the plate with protrusions extending from a lower surface (not shown) to align with the gaps between the cutting members, so as to allow ram plate 66 to continue applying a feed force upon the upper-most portions of each block segment until these portions have been pushed past the widest portion of the cutting blade wherein they may fall into the reservoir of molten material.

FIG. 8 exemplifies an alternative pressure application means 78 in which a movable member, shown as ram plate 80, pivots from a hinge 82 and is driven by an actuator 84 to apply pressure to the blocks of solid sealant material 24. Any convenient form of mechanical output actuator 84 may be utilized for driving the motion of ram plate 80. Within this embodiment, ram plate 80 is shown with protrusions 86 which extend from ram plate 80 and align with the spaces between cutting members 44 to aid in pressing the blocks 24 all the way past the leading edges 50 of cutting members 44 to speed cutting. It is preferred that the direction of loading of the sealant blocks be in a direction parallel to cutting members 44, wherein the impact forces from sealant blocks being dropped onto the cutters are generally distributed longitudinally along the length of the cutter member and not directed to the sides of the cutting edges which are generally more susceptible to bending, displacement, or damage. Furthermore, considering the angular motion of ram plate 80 it is preferred that hinge 82 be aligned perpendicular to the direction of cutting members 44, so that pressure from ram plate 80 does not create sideward loads on cutting members 44. The simple angular ram plate shown has an advantage of greater simplicity, however, the applied pressure upon the blocks against the cutting members is generally not as well distributed as that created with a device which applies pressure in a plane which remains parallel to the leading edges of cutting members 44.

Figure 9:
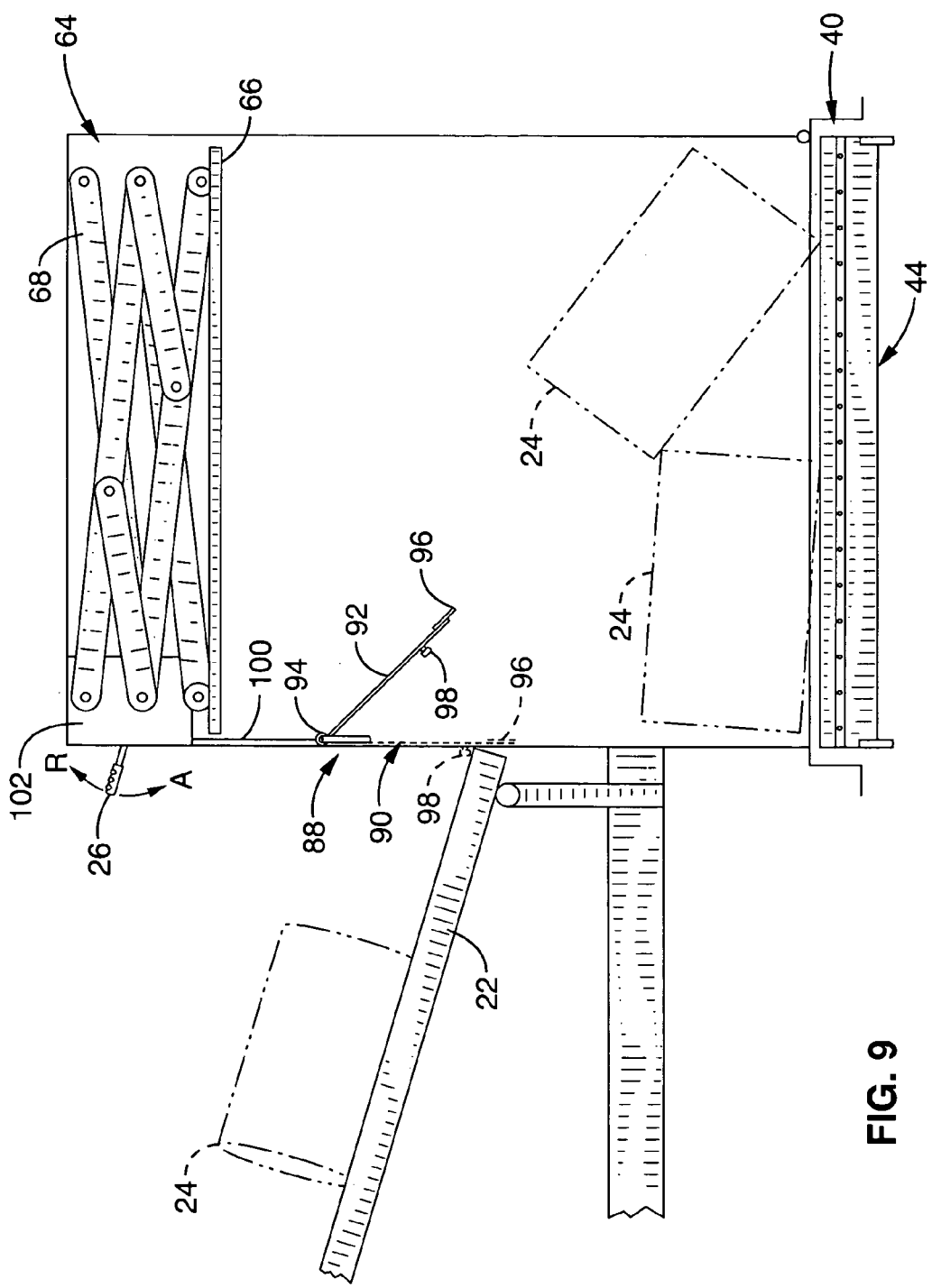
FIG. 9 is a partial cross-section view of a solid sealant cutter assembly with loading door according to an aspect of the present invention, shown with a loading door through which solid sealant may be loaded when the ram plate is in a retracted position.

FIG. 9 exemplifies an embodiment of a loading door assembly 88 within enclosure 20, wherein an opening 90 is fitted with a door 92, that is shown articulated on a spring loaded hinge 94 which preferably biases the door into a closed position. A restraint tab 96 is shown on door 92 to limit the travel of door 92 when reaching the closed position. A knob 98 is shown to allow manual opening of the door, such as during maintenance or for otherwise checking conditions within the enclosure 20, or sealant chamber 14. A loading door interlock, comprising a door latch 100 and an interlock control unit 102, are shown for operation in conjunction with ram device actuation control 26.

When ram device 64 is positioned in a fully retracted position, such as shown, as sensed within interlock controller 102, then the interlock is deactivated and door latch 100 is held in an unlocked condition. When unlocked, the loading door 92 may be opened, such as for loading of additional solid sealant blocks 24. If loading door 92 is jammed open, such as having a block of sealant in the opening, then attempts to activate the ram drive will be prevented until door latch 100 can be engaged in the locked position. It will be appreciated, therefore, that the interlock is preferably utilized to condition when the ram device may be safely operated. Activating the ram device when the door is held in an open condition could subject the door or other aspects of the system to damage, especially if items are partially protruding through opening 90 when the ram device is activated, and may in some cases pose a safety hazard. With the door closed, then upon engaging ram device 64, the door lock 100 is extended by the interlock to retain the door in a closed position, and the operating cycle of the ram device commences.

Alternatively, loading door 90 may be operated by actuators or similar mechanical output devices to power the door into closed and open states, such as in response to the position and/or operation of the ram device. By way of example, a loading door or aperture may remain closed while ram device 66 is extended against cutter assembly 40 and the opening into sealant melter chamber 14 to prevent splatter and other such fluid losses. The ram plate 66 may be normally retained in the closed position, and only moved into the open position when introducing additional solid sealant into enclosure 20. After loading a desired quantity of sealant blocks, loading door 90 may be closed automatically in response to activating ram device 64. It will be appreciated that interlock mechanisms may still be provided to prevent inadvertent activation of ram device 64. Similar loading door mechanisms may be implemented by one of ordinary skill in the art without departing from the teachings of the present invention.

The present invention also contemplates optionally controlling the movement of ram device 64 in combination with the amount of heating provided in cutting members 44 to modulate the rate at which blocks are cut to coincide with the measured fluid level of molten sealant being maintained within the sealant melter. In this way the operators of the unit need not monitor sealant chamber reservoir levels but need only reload the enclosure with new sealant blocks after the previous block(s) have passed through the cutter and into the sealant reservoir. It will be appreciated that a control circuit, analog or digital (i.e. a miniature microprocessor based process control unit), can readily control melter chamber heating, blade heating, ram pressure, fluid pressure, and combinations thereof, to produce any desired rate of block cutting in response to the state of the sealant reservoir. The state of the sealant reservoir may be measured according to fluid volume levels, temperature, block loading factors, ram plate position, cutting rate, and so forth.

Another aspect of the invention involves the conveyance of heated sealant from a heated reservoir to an applicator head. Heating the sealant while it traverses the hose provides more consistent sealant temperature and viscosity during application, and can prevent clogging and other problems associated with hardening sealant.

Figure 10:
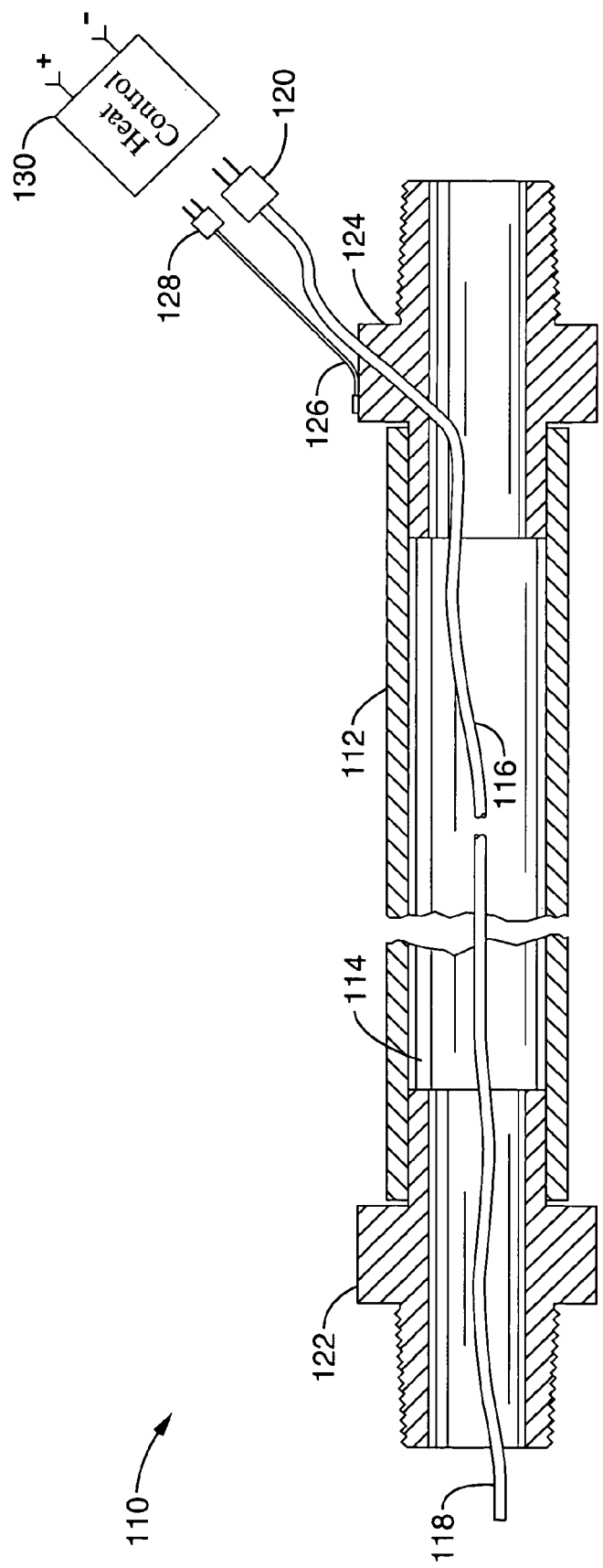
FIG. 10 is a cross-section view of a sealant conveyance hose according to an aspect of the present invention, shown with a heating element retained in the core of the hose.

FIG. 10 exemplifies a section of an electrically-heated conveyance hose 110 having a hose section 112 and flow passageway 114 according to one embodiment of heated sealant hose. An electrical heating element 116 is retained within the flow passageway for heating the liquid sealant as it passes along passageway 114. Heating element 116 is shown with a terminating end 118 and a connector end 120. Using one or more heater loops within heating element 116 allows the heater to provide any desired power dissipation while requiring only a single entry point into the hose. It will be recognized that the heating element could also be configured to enter and exit at different locations along the hose span wherein an electrical connection to both ends of the heating element span would then be required.

Hose section 112 is shown extending between two fluid couplings, such as toward an applicator head (not shown) with coupling 122, and the sealant melter (not shown) with a second coupling 124. The heating element preferably exits passageway 114 at second coupling 124, such as located toward the sealant melter or other device providing the source of power for operating the heating element. It will be appreciated that the heating element may be integrated with the coupling, inserted and sealed therein, or electrically connected to a power source by alternative mechanisms recognizable to one of ordinary skill in the art without departing from the teachings of the present invention.

A means for regulating energy dissipation within the heating element is utilized so that the fluid temperature within the hose can be maintained at a desired temperature, or provide a desired level of heating. By way of example, a thermocouple 126 is shown connecting to hose coupling 124, which should be substantially thermally conductive (i.e. fabricated from brass, other metallic materials, or otherwise thermally conductive material), for indirectly registering the temperature of the molten sealant passing through passageway 114. Alternatively, the thermocouple may be retained within or proximal to passageway 114 for registering sealant temperature, wherein hose coupling 124 need not be manufactured of a thermally conductive material. Thermocouple 126 is shown terminating in an electrical connector 128 configured for connection with a temperature controller 130 which supplies power to the heating element in response to the registered temperature (or other temperature related characteristics) of the sealant. Temperature controller 130 may be implemented in a number of ways, such as from simple thermostatic units up to more complex analog or digital electronic controllers that regulate output power in response to one or more input variables. It should be readily appreciated that a hose heated internally can be manufactured with a smaller cross sectional area, wherein it may be lighter in weight, have added flexibility, and be generally less prone to leakage, breakage, and other similar problems which plague existing systems.

Alternative methods may be less preferably employed for maintaining proper sealant temperature as the liquid sealant material traverses hose 112. By way of first example, a length of tubing through which circulates a heated flow of liquid may be substituted for the electrical heating element. A liquid material, such as a high flash point oil, may be heated to a temperature at or exceeding the desired temperature to which the sealant is to be heated and circulated through the tubing which, since it is located within the interior of the sealant hose heats the liquid sealant. Modulating (e.g., varying or otherwise controlling) the rate of flow of the heating liquid or its temperature allows the liquid sealant temperature to be controlled. Instead of slowing the flow of sealant to provide for proper viscosity, the temperature can be raised by controlling the flow or temperature of the heating liquid. By way of a second example, the heated sealant entering the sealant hose may be kept in circulation even when no sealant is being dispensed. This may be embodied by incorporating a small return path hose (not shown) as a return conduit from the applicator head, through which a selected flow rate of material is maintained even if no material is being dispensed by the applicator head. In this way a flow of hot material is circulated through the sealant hose and back through the return hose regardless of the application flow rate. The material in the hose therefore will remain near the desired temperature even if no sealant is dispensed for an extended period of time. The return flow hose may be retained within the interior of the sealant hose, or alternatively be outside of the sealant hose, either attached to the sealant hose or retained in separation therefrom. Notwithstanding the foregoing, it should be appreciated that the electrical heating element is a preferred heating method as it is not subject to the drawbacks of leakage and contamination that can arise when adding heated flow hoses for heating the sealant.

The application of sealants to the cracks themselves has suffered from a number of drawbacks as previously described, such as controlling the flow of sealant to meet the crack capacity and the speed with which cracks may be filled.

Figure 11:
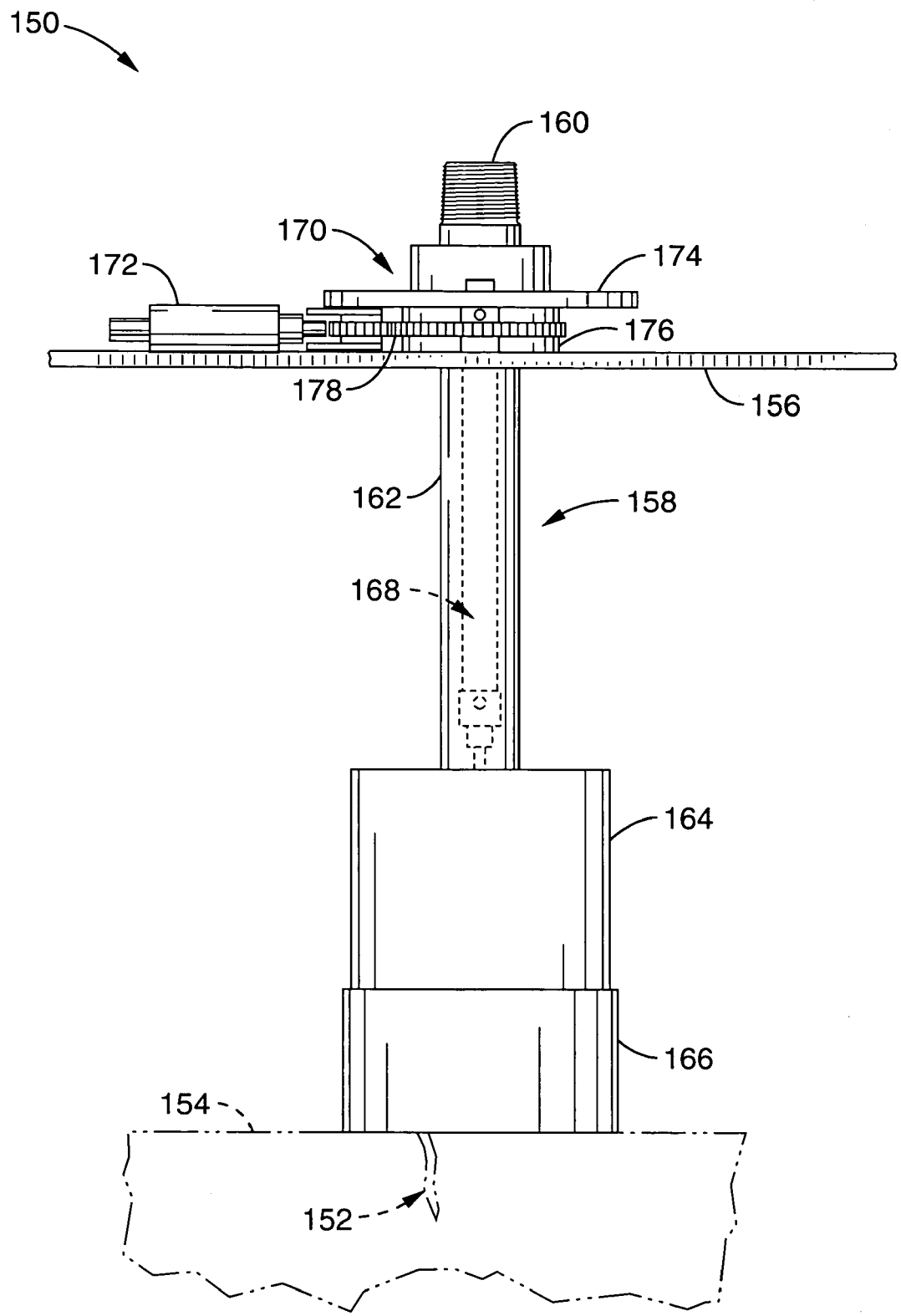
FIG. 11 is a side view of a crack sealing head according to an aspect of the present invention, shown with a contact ring and sealing chamber into which heated sealant may be received under pressure for filling the pavement cracks.

FIG. 11 exemplifies a crack sealing head 150 shown for applying a sealant to a crack 152 in a pavement surface 154. Crack sealing head 150 is shown extending from a housing 156, such as an automated crack sealing platform attached to a vehicle or being towed from a vehicle. Crack sealing head 150 comprises a dispensing tube 158 having a sealant inlet 160 coupled through a body 162 to a sealing chamber 164 upon which a contact ring 166 is preferably attached. The body 162 of dispensing tube 158 may be configured with optional insulation and/or means for heating dispensing tube 158, such as an electric heater, or a coupling through which heated liquids are passed at a sufficiently high temperature and flow rate to heat the material flowing through the dispensing tube to a desired thermal state.

A float cylinder 168 provides for controlling the volume within sealing chamber 164. Contact ring 166 is configured for providing a seal against the pavement surface, allowing filling of the chamber with liquid sealant. In response to movement along the crack, contact ring 166 is subject to wear in the direction of motion. The inclusion of an optional rotation means is shown with a rotational coupling 170 driven by a rotational drive actuator 172 to equalize the wear on contact ring 166 to increase longevity and reduce maintenance overhead. Rotational coupling 170 is shown comprising a base plate 174, rotational bearing 176, and gearing 178 to couple the power from drive actuator 172 to dispensing tube 158.

Liquid sealant is passed into sealant inlet 160 through body 162 to fill sealing chamber 164 and associated contact ring 166 to provide sufficient quantity and pressure of sealant to fill the cracks in pavement surface 154. Contact ring 166 is shown slidably engaged with sealing chamber 164 and biased against pavement surface 154 to maintain a sufficient seal for properly filling crack 152.

Figure 12:
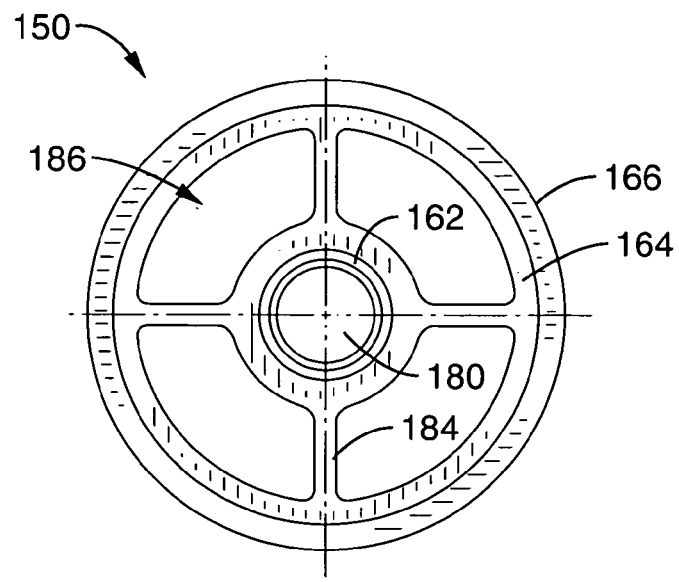
FIG. 12 is an underside view of the crack sealing head according to an aspect of the present invention.
Figure 13:
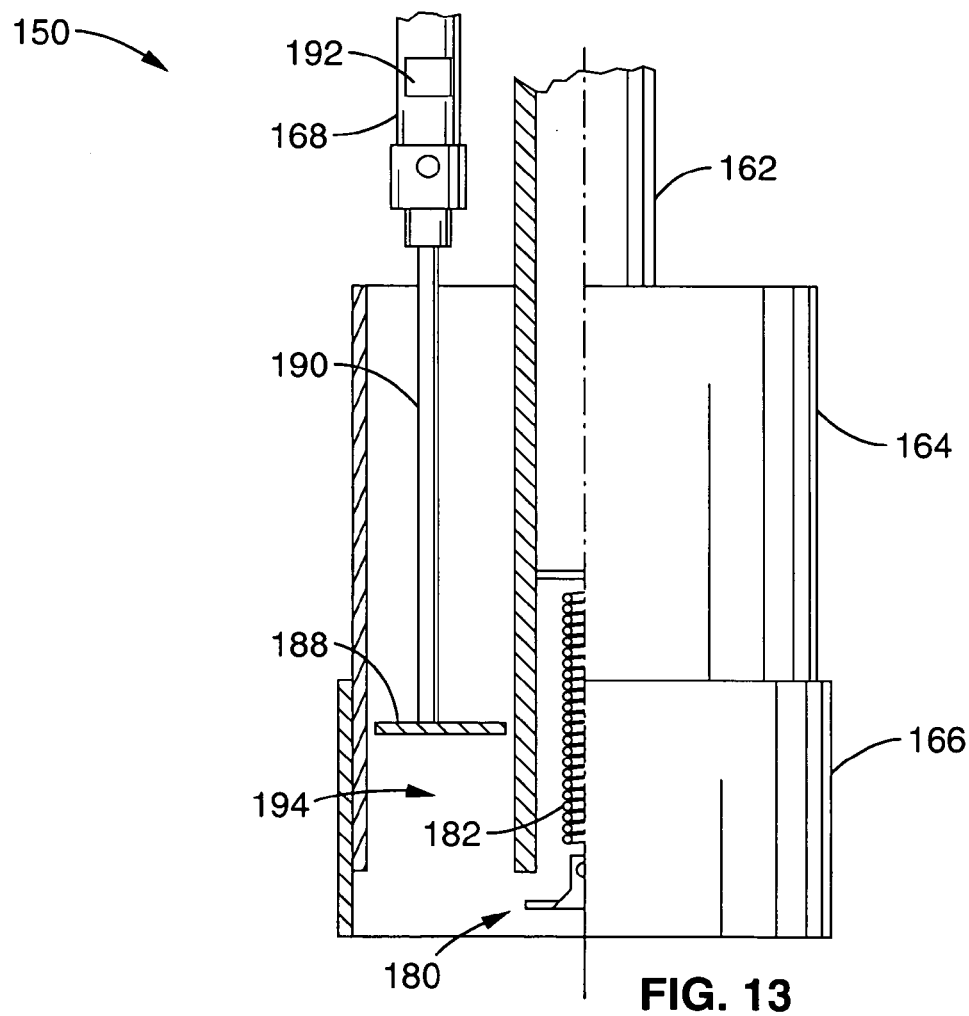
FIG. 13 is a cross-section view of the crack sealing head according to an aspect of the present invention, shown with dispensing tube, sealing chamber, and contact ring.

FIG. 12 and FIG. 13 illustrate an embodiment of sealing head 150 in detail with an underside and side view depiction. Contact ring 166 is shown surrounding sealing chamber 164 into which dispensing tube 162 extends. The lower surface of contact ring 166 is preferably sufficiently compliant to maintain a seal with pavement surface 154 for substantially retaining the liquid sealant when filling a crack. The compliance of the pavement interface may be provided in a number of ways, such as utilizing a compliant ring 166 fixedly coupled to sealing chamber 164, or by utilizing a non-compliant ring compliantly coupled with sealing chamber 164, or a combination thereof. The compliant ring could comprise a flexible material, such as rubber or silicone, or a series of separately compliant elements operating semi-independently, or independently, for instance the bristles of a brush member. A compliant coupling can be provided by compliantly coupling contact ring 166 to sealing chamber 164, such as by means of a slidable engagement which is preferably biased using gravity or a biasing member to retain a seal pressure against the pavement surface. It will be appreciated that combinations and variations of these approaches may be implemented to provide a seal between sealing chamber 164 and pavement surface 154.

The face of a check valve 180 is shown attached to a biasing means 182 depicted as a spring within dispensing tube 162. Check valve 180 prevents the unrestricted flow of sealant material into sealing chamber 164. Check valve 180 is preferably biased by biasing means 182 to remain in a closed position unless subjected to a pressure which exceeds the static liquid sealant pressure in the line ("standing pressure") as previously described. Upon activation of the pump, or controlling valves along the way, the increased pressure of sealant fluid causes check valve 180 to overcome the bias force, wherein heated sealant is dispensed from sealant head 150.

An open structure member 184 couples dispensing tube 162 to sealing chamber 164, which is exemplified as a set of four webs surrounding flow spaces 186 through which the liquid sealant material may be passed. A float plate 188 is retained within sealing chamber 164 and coupled through an elongated member 190 to float cylinder 168. Modulating the position of float plate 188 controls the volume of sealant material which may be retained within sealing chamber 164. Shown within float cylinder 168 are means 192 for controlling the actuation of float cylinder 168, such as the use of reed switches, or more sophisticated control circuits such as an actuator controller coupled to a microprocessor for orchestrating the operation of the various system aspects to increase system safety and efficiency. Sealing chamber 164 is configured to retain a reservoir 194 of liquid sealant which is bounded by pavement surface 154 on a lower side of contact ring 166 coupled to sealing ring 168, and float plate 188 on the upper side. Means 192 for controlling the actuation of float cylinder 168 can be operated to maintain a desired volume or pressure of material within reservoir 194 when operated in concert with controlling the flow of liquid sealant material exiting dispensing tube 162.

Figures 14, 15, 16:
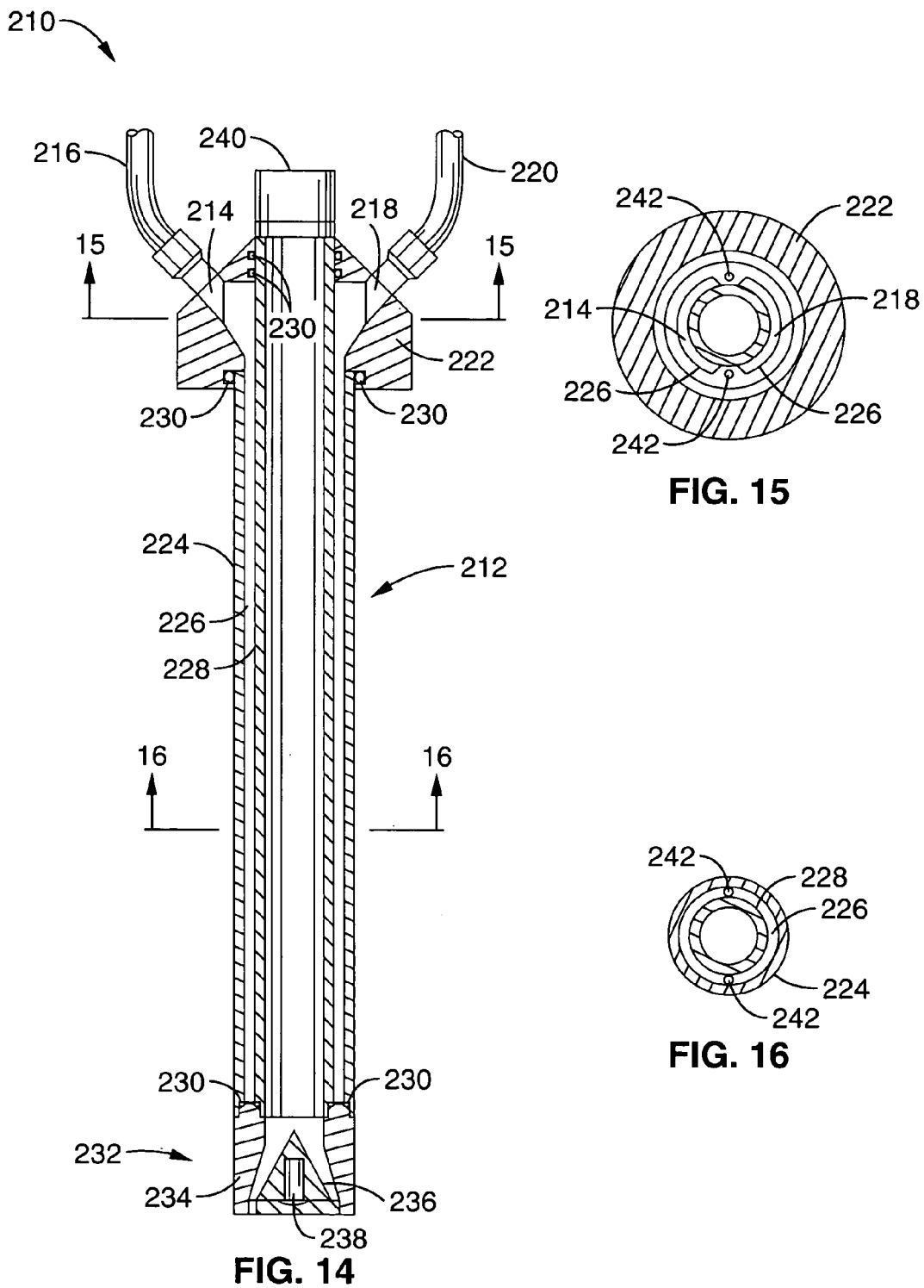
FIG. 14 is a cross-section view of a heated dispensing tube according to an aspect of the present invention.
FIG. 15 is a cross-section view of the heated dispensing tube of FIG. 14 taken horizontally across an upper section of the dispensing tube.
FIG. 16 is a cross-section view of the heated dispensing tube of FIG. 14 taken horizontally across a lower section of the dispensing tube.

FIG. 14, FIG. 15, and FIG. 16 exemplify a heated sealant applicator head 210 shown with dispensing tube 212 configured with an input aperture 214 to which is coupled inlet tubing 216, such as a Teflon™ hose material that can withstand the temperature and chemical compositions of the heated liquid (i.e. high flash point oil) being passed through for heating dispensing tube 212. The inlet and outlet couplings are configured within a cap member 222 to which an outer wall 224 and inner wall 228 are coupled, such as by a mechanical engagement which may be sealed with O-rings 230. A space referred to as a fluid heating cavity 226 is formed between the inner 228 and outer 224 walls in the body of dispensing tube 212. Similarly, an output aperture 218 is coupled to outlet tubing 220 for circulating the heated material back to the heat source (not shown). Dispensing tube 212 is configured with one or more passageways through which the heated liquid, such as oil, is passed to heat the sealant material as it flows through dispensing tube 212. By way of example, dispensing tube 212 is configured with an elongated cavity 226 formed between an outer wall 224 and an inner wall 228. The passageway is divided to encourage heated liquid to flow the length of the dispensing tube which provides even heating along dispensing tube 212. One mechanism for assuring even heating is splitting the cavity vertically into a first half and a second half which are connected at the distal end of dispensing tube 212, wherein heated fluid flows down the first half of the cavity then crosses to the second half of the cavity near the end of the dispensing tube and returns up through the outlet to be recirculated. The first and second halves of the cavity are formed by creating channels within the interior of the outer wall 224 or the exterior of inner wall 228, or by inserting a spacer between the inner wall 228 and outer wall 224. It will be appreciated that dispensing tube 212 may be alternatively heated using electrical heating elements, or similar, to maintain a desired sealant temperature.

FIG. 15 and FIG. 16 illustrate cavity 226 formed within cap member 222 and between the outer wall 224 and inner walls 228 of dispensing tube 212, respectively. One preferred form of spacer is shown in FIG. 16 as rods 242 extending along the length of dispensing tube 212. It will be appreciated that the cavity may be formed in a spiral, or provided with a number of various flow passages to provide even heating surrounding the interior of dispensing tube 212. An applicator assembly 232 is shown coupled on the distal end of dispensing tube 212, such as mechanically engaged and sealed with O-rings 230. Applicator assembly 232 comprises a body section 234 within which is disposed a cone valve 236 with a biasing member 238. Cone valve 236 is biased into a closed position, preferably with a sufficient force to prevent sealant fluid flow in response to static line pressure conditions. As used herein, static line conditions are considered to arise when the sealant pressure in dispensing tube 212 is subjected to the pressure associated with a "standing" column (generating a "standing pressure")

of sealant material within dispensing tube 212 and the fluid communication system leading thereto (i.e. pipes, hoses, tubes, fittings, and so forth). During static line conditions dispensing tube 212 is not subjected to pressures applied by a dispensing pump mechanism. When a dispensing pump is activated for dispensing sealant, cone valve 236 responds to the additional sealant pressure by opening to allow a flow of sealant to enter sealant inlet 240 and pass through the interior of dispensing tube 212 and out through applicator assembly 232.

Figure 17:
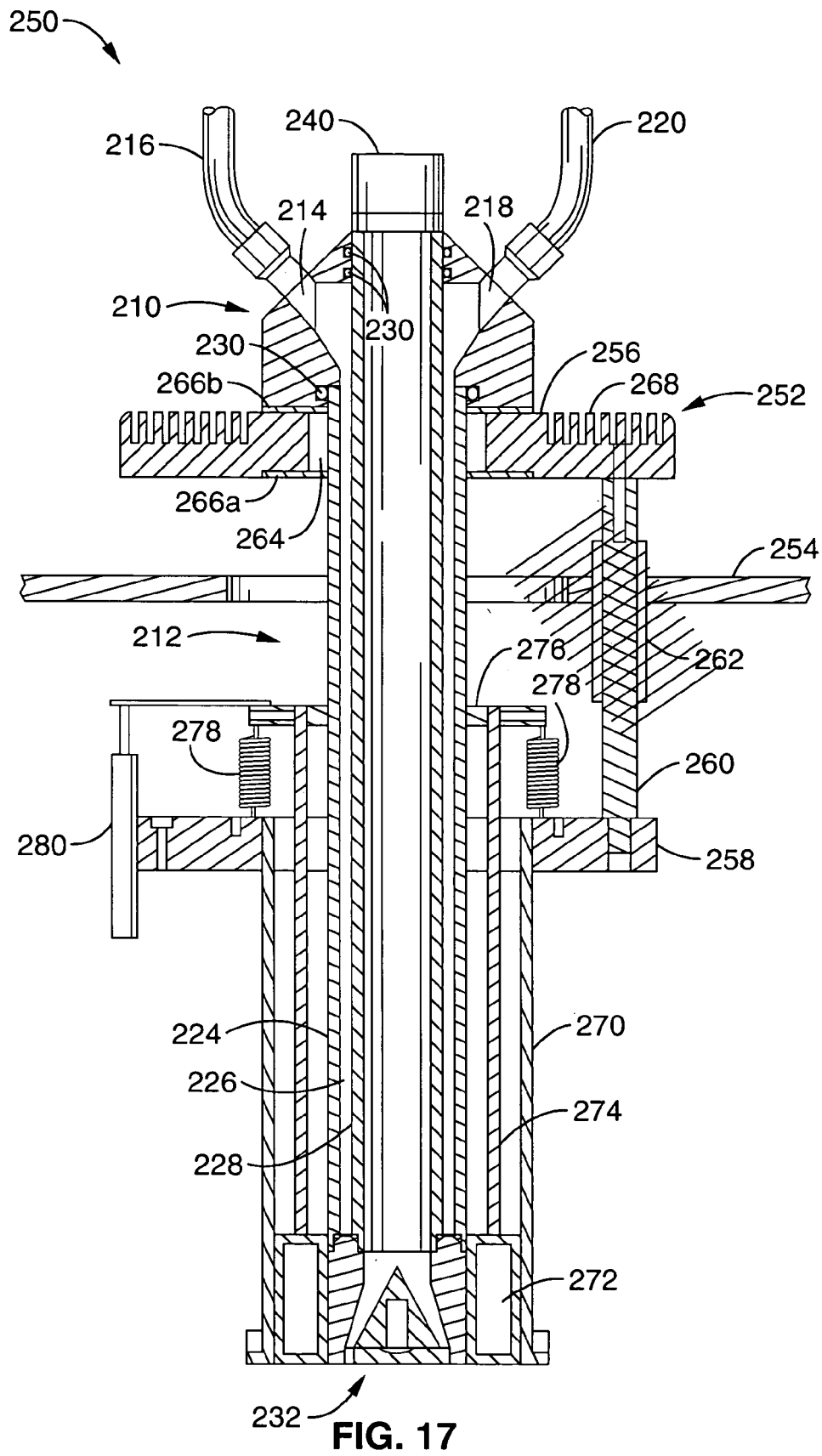
FIG. 17 is a cross-section view of a crack sealing head according to an aspect of the present invention, shown incorporated within a vertical motion platform.
Figure 18:
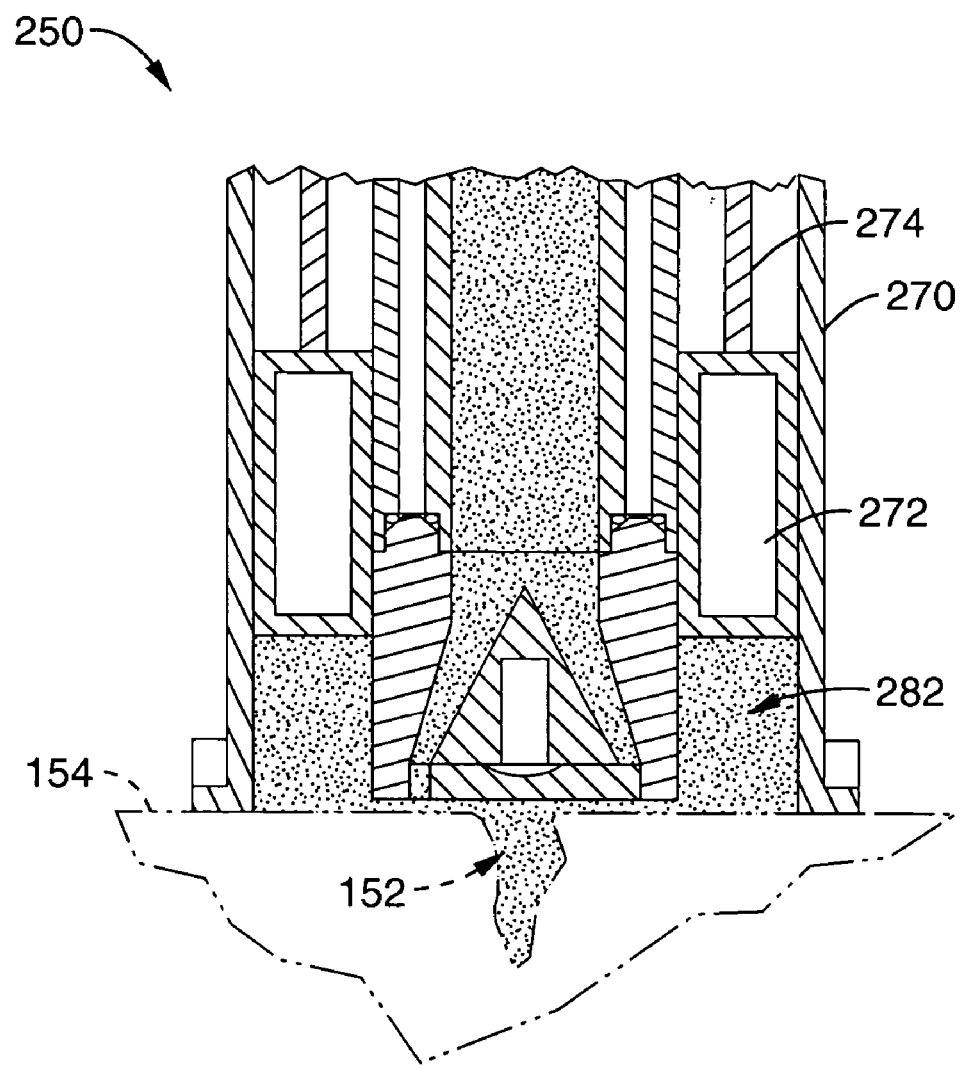
FIG. 18 is a detailed cross-section view of the crack sealing head of FIG. 17.

FIG. 17 and FIG. 18 depict a crack sealing head 250 comprising a heated dispensing tube 210 retained within a movable platform 252 that moves in relation to a stationary base member 254, such as the base of a trailer or other movable platform. As roadway surfaces are not perfectly planar, the use of a movable platform provides a means by which the sealing chamber can follow the contours of the road to maintain a seal while filling cracks in the road surface.

To prevent the movable platform from being subjected to high temperatures, portions of movable platform 252 may be constructed with cooling means, such as heat dissipation structures implemented in the form of fins, posts, or similar structures to increase the surface area of movable platform 252.

The exemplified movable platform 252 comprises an upper ring 256 and a lower ring 258 which attach to dispensing tube 212 or adjoining structures. At least two slider bars 260, and preferably three, are retained between upper ring 256 and lower ring 258. Slider bar 260 is configured with means for allowing vertical displacements, such as being engaged within a linear roller bearing sleeve 262 that allows slider bars 260 to freely move in one axis of motion, such as vertical, while constraining motion in other directions. Although shown orthogonal to stationary base member 254, it will be appreciated that movable platform 252 may be slightly canted, such as toward or away from the direction of travel, to better facilitate vertical compliance when subjected to the drag force on contact ring 284.

The thermally conductive structural contact between heated dispensing tube 210 and movable platform 252 may be reduced in a number of ways to limit heat losses from dispensing tube 210 while preventing excessive heat buildup within movable platform 252. It should be noted that dispensing tube 212 may operate at temperatures in the range of from 350° F. to 400° F. A number of thermal isolation mechanisms are described herein by way of example, and not of limitation. Upper ring 256 is depicted with thermal reliefs 264 wherein a space of air is retained between dispensing tube 212 and movable platform 252 by thermally insulating ring spacers 266a, 266b retained over and under portions of upper ring 256. The insulating spacers 266a, 266b preferably include apertures (not shown) to facilitate air flow. Slots 268 are shown within upper ring 256, such as resulting from machining, stamping, or molding wherein rings are created that operate as "cooling fins" by increasing available surface area. Additionally or alternatively, cooling fins may be joined to portions of movable platform 252 to facilitate cooling.

The depicted sealant applicator head provides a range of motion of approximately six inches (6"), while it should be appreciated that a range of platform motion of from at least two inches (2"), up to and including about twelve inches (12") may be readily accommodated. Linear bearing 262 exhibits a low sliding resistance in contact with slider bar 260 and requires a minimum of maintenance, although it should be recognized that bushings or other motion enabling means may be additionally or alternatively utilized without departing from the teachings of the present invention.

A sealing chamber 270 is shown surrounding the lower portion of dispensing tube 212 and applicator assembly 232 for maintaining a reservoir of sealant in contact with the pavement surface being filled. Float 272 is shown slidably engaged between the interior of sealing chamber 270 and the exterior 224 of dispensing tube 212. Coupling members 274, which may implemented as separate members or in a ring shape, connect float 272 to an upper float plate 276. Float biasing springs 278 provide a resistance to float movement in relation to applied pressure of contained sealant. It should be appreciated that any convenient biasing mechanism may be utilized for producing the biasing force to oppose float movement, and that active actuators may be alternatively utilized with a control system for regulating the volume and pressure of retained sealant. A float position detector 280 is coupled to float plate 276, or alternatively to any structure that moves in response to the motion of float 272. Float position detector 280 may comprise a linear potentiometer or similar means for sensing rectilinear extension of float 272, such as a potentiometer or sensor configured to generate an output signal in response to the motion of float 272.

During operation, the internal sealant pressure is typically maintained at between two PSI (2 PSI) to about eight PSI (8 PSI) above ambient pressure levels for forcing heated sealant into the interior of pavement cracks underlying sealing chamber 270. It will be appreciated, however, that higher sealant pressures may be utilized depending on the specific implementation of the system, for example sealant pressures up to, or above, approximately thirty PSI (30 PSI) above ambient pressure levels may be readily adopted. A reservoir of sealant is retained within sealant chamber 270 whose volume changes as sealant is applied to cracks or added to sealant chamber 270 from dispensing tube 212. As the reservoir of sealant is being depleted, float 272 drops wherein position detector 280 signals to a fluid dispensing controller (i.e. pump motor control, or valve control) to increase the flow rate, or pressure, of sealant flow. The system can thereby operate in a closed-loop feedback mode to maintain a supply of sealant in the reservoir which is sufficient under a given set of pavement crack sealing conditions.

FIG. 18 illustrates crack sealing head 250 with a reservoir of sealant 282 being retained within sealing chamber 270, beneath float 272 to aid in filling crack 152 in pavement 154. Float 272 maintains a pressure upon the sealant within sealing chamber 270 to drive the sealant into the underlying cracks to thereby increase both the depth and speed of sealant penetration while improving the integrity and longevity of the sealant patch.

Figure 19:
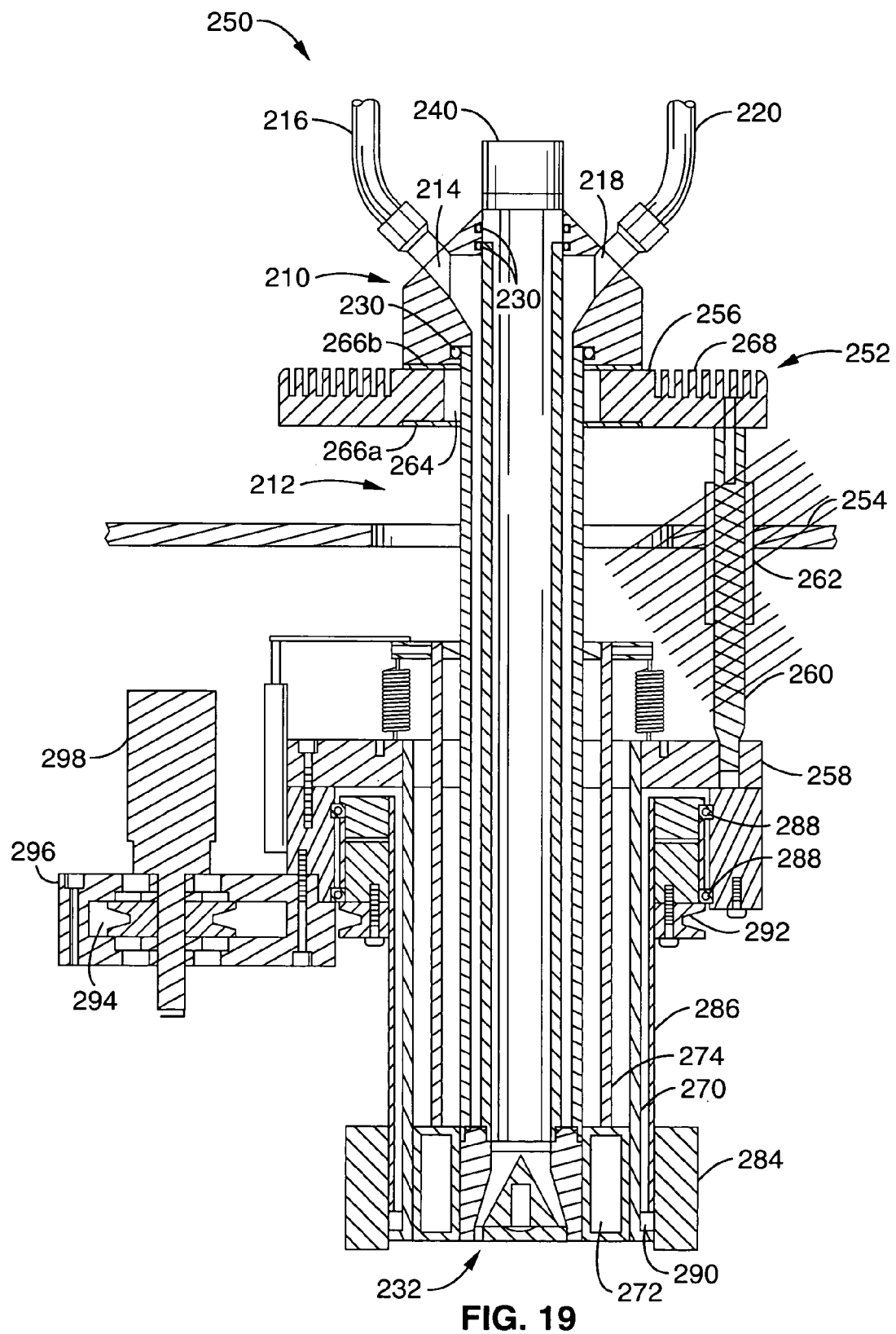
FIG. 19 is a cross-section view of the crack sealing head of FIG. 17, shown with a rotating contact ring.

FIG. 19 exemplifies crack sealing head 250 configured with a contact ring 284 attached to rotating housing member 286 rotatably coupled to sealing chamber 270 with upper bearing races 288 and lower bearing race 290. Contact ring 284 may be implemented using compliant structures that can seal against the pavement and function similar to a squeegee for sculpting the sealant to a desired profile. A power coupling 292, exemplified as a belt groove, is connected to rotating housing member 286. A corresponding power coupling 294 is shown in a motor mount 296 coupled to a source of mechanical power 298, such as an electric motor or similar. The power couplings 292, 294 are configured for receiving a V-belt (omitted for clarity) for coupling the rotating output to the motor to the rotatable housing 286. In this way the position of contact ring 284 may be varied to maintain even wear, or to otherwise provide for more control over the sculpted surface left by the squeegee action of contact ring 284. Contact ring 284 in this embodiment is exemplified as a thick rubber collar section attached to rotating housing member 286.

The attachment between contact ring 284 and housing member 286 may be a fixed or variable position attachment. For example, contact ring 284 may be implemented with an interior thread on an upper portion that threadably engages the exterior of housing member 286, while a locking pin or similar locking mechanism prevents undesired rotation of contact ring 284 about housing 286 during operation. A variable engagement, such as described, can allow the contact ring to be periodically repositioned (instead of being replaced) to maintain seal integrity, wherein the service life of each contact ring may extended dramatically.

Accordingly, it will be seen that this invention provides a number of inventive aspects that improve sealant melting and dispensing operations. The invention is particularly well suited for use with the automated sealing of pavement cracks or similar sealant applicator applications. The invention describes aspects relating to the reducing block sizes introduced at the melter, keeping sealants heated along the span of hose to the dispensing head, and for dispensing the liquid sealants under pressure for filling pavement cracks. It should be appreciated that the numerous aspects of the invention may be utilized separately within sealant systems and processes, or applied in various beneficial combinations. Although the aspects of the invention may be applied for speeding manual sealant operations, they are particularly well suited for use in combinations with automated sealant equipment that can require higher feed rates and improved control over sealant dispensing.

Although the description above contains many specificities, these should not be construed as limiting the scope of the invention but as merely providing illustrations of some of the presently preferred embodiments of this invention. Thus the scope of this invention should be determined by the appended claims and their legal equivalents. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An apparatus for melting solid sealant material into a molten liquid sealant material in preparation for being dispensed to an applicator head, comprising:
    means for severing a mass of sealant material into multiple substantially unmelted segments;
    means for applying feed pressure to the mass of sealant material against said means for severing;
    a heating chamber adapted to receive said multiple severed segments of sealant material and to substantially melt the multiple severed segments; and
    means for delivering the multiple severed segments into the heating chamber.

2. An apparatus as recited in claim 1, wherein said means for severing comprises:
    at least one cutting member; and
    means for heating said cutting member.

3. An apparatus as recited in claim 2, wherein said means for heating said cutting member comprises:
    a heating element retained within said cutting member; and
    a control circuit configured for regulating the power being applied to said heating element to provide a desired feed rate by which sealant material is severed by said cutting member being heated by said heating element.

4. An apparatus as recited in claim 1, wherein said means for applying a feed pressure comprises:
    a movable member configured to move from a first position for receiving said mass of sealant material to be severed and a second position wherein at least a substantial portion of said mass of sealant material has passed through said means for severing; and
    a mechanical driver element configured for applying a force to urge said movable member from said first to said second position.

5. An apparatus for melting a mass of sealant material into a molten liquid for being dispensed by an applicator, comprising:
    at least one cutting member;
    means for heating said cutting member;
    means for applying a feed pressure to a mass of sealant material against said at least one cutting member;
    wherein said heated cutting member is adapted to cut the mass of sealant material into multiple substantially unmelted segments in response to the applied feed pressure from the means for applying the feed pressure; and
    a heating chamber adapted to receive said multiple substantially unmelted segments of sealant material from said cutting member.

6. An apparatus as recited in claim 5, wherein said means for heating said cutting member is configured for retaining the temperature of said cutting member near the melting point of solid sealant material.

7. An apparatus as recited in claim 5:
    wherein said cutting member has a first cross section retained substantially perpendicular to the direction of sealant material travel through said cutting member and a second cross section retained substantially parallel with the direction of sealant material travel;
    wherein said first cross section is substantially narrower than said second cross section toward the object of reducing feeding forces required for severing said mass of sealant material into said multiple segments;
    wherein said second cross section of said cutting member provides a sufficient depth of material to withstand the forces being applied to said cutting member.

8. An apparatus as recited in claim 7, wherein said cutting member is configured with a substantially sharp leading edge, upon which said mass of sealant material first makes contact with said cutting member, which facilitates cutting through said mass of sealant material.

9. An apparatus as recited in claim 8, wherein said leading edge of said cutting member has a sharp terminal radius not to exceed a range from approximately one-sixteenth inch (1/16") to approximately one-eight inch (1/8").

10. An apparatus as recited in claim 8, wherein said leading edge of said cutting member has a terminal radius of less than approximately one-eighth inch (1/8").

11. An apparatus as recited in claim 5, further comprising:
a loading enclosure surrounding said cutting member, said means for heating said cutting member, and said means for applying a feed pressure;
wherein sufficient volume is provided within said loading enclosure for retaining a the mass of sealant material in contact with said cutting member.

12. An apparatus as recited in claim 11, wherein a movable portion of said means for applying a feed pressure is configured to establish a seal against said cutting member and said opening of said heating chamber through which said solid mass of sealant material is received to prevent loss of molten sealant despite said apparatus being exposed to vibration and attitude fluctuation.

13. An apparatus as recited in claim 11, further comprising a loading door within said loading enclosure through which said mass of sealant material can be introduced for being cut by said cutting member.

14. An apparatus as recited in claim 13, further comprising an actuator for opening said loading door in response to the position of said means for applying a feed pressure to mass of sealant material as received and retained against said at least one cutting member.

15. An apparatus as recited in claim 13, wherein the operation of said loading door is responsive to the position or motion of said means for applying feed pressure.

16. An apparatus as recited in claim 13, further comprising an interlock for said loading door that prevents said loading door from opening during at least portions of the operating cycle of said means for applying a feed pressure.

17. An apparatus as recited in claim 16, further comprising a biasing member coupled to said loading door which applies a biasing force to retain said loading door in a closed position unless said interlock is activated.

18. An apparatus as recited in claim 5, further comprising a visual indicator that displays the position of said means for applying a feed pressure within said enclosure.

19. An apparatus as recited in claim 18, wherein said visual indicator comprises a mechanical element coupled to said means for applying a feed pressure.

20. An apparatus as recited in claim 5, wherein said means for heating said cutting member comprises:
an electrical heating element retained within said cutting member; and
a control circuit configured for regulating the power being applied to said heating element to provide a desired feed rate by which sealant material is severed.

21. An apparatus as recited in claim 5, wherein said heating chamber is configured for melting said multiple segments of sealant material into molten sealant material in preparation for being applied to a surface for filling voids.

22. An apparatus as recited in claim 21, further comprising:
a conduit attached to said heating chamber for conveying said molten sealant material; and
an applicator head attached to said conduit for receiving said molten sealant material and applying it to a surface.

23. An apparatus as recited in claim 22, further comprising:
a heating element passing through at least a portion of the interior of said conduit; and
a heating controller connected to said heating element and configured for regulating the temperature of the molten fluid along at least a portion of said conduit as it passes toward said applicator head.

24. An apparatus as recited in claim 5, wherein said means for applying a feed pressure to said mass of sealant material against said at least one cutting member comprises:
a movable member retained proximal to said heating chamber and disposed between a first position and second position; and
means for applying a motive force to said movable member between said first and said second positions.

25. An apparatus as recited in claim 24:
wherein positioning of said movable member at said first position provides a sufficient amount of physical separation between said movable member and said means for severing and said mass of sealant material;
wherein positioning of said movable member at said second position provides a reduced amount of said physical separation between said movable member and said means of severing;
wherein said movable member is configured to apply a feed force upon said mass of sealant material driving it against said cutting member in response to said movable member traversing a path from said first position to said second position.

26. An apparatus as recited in claim 25, wherein said means for applying said motive force comprises a mechanically actuated element.

27. An apparatus as recited in claim 26, wherein said mechanically actuated element comprises a gravity driven movable member.

28. An apparatus as recited in claim 24, wherein said means for applying said motive force comprises a hydraulic actuation system.

29. An apparatus as recited in claim 24, wherein said means for applying said motive force comprises an electric actuation system.

30. An apparatus for severing a mass of solid sealant material into a number of separate segments that are more readily melted into a molten sealant that may be applied using an applicator head to fill voids in a surface, comprising:
at least one cutting member configured for cutting the mass of solid sealant material into the number of separate segments in response to an applied heat and feed pressure of the mass of solid sealant material onto the at least one cutting member, and also configured for being coupled to an opening within a heating chamber through which the separate segments are received for being liquefied within said heating chamber;
means for electrically heating said cutting member; and
means for applying a feed pressure to solid sealant material against said at least one cutting member.

31. An apparatus as recited in claim 30, wherein said cutting member is configured for being coupled to said heating chamber so that segments of solid sealant material drop into a reservoir of molten sealant material within said heating chamber after being cut by said cutting member.

32. An apparatus for severing a mass of solid sealant material into smaller segments to speed melting within a heating chamber of a sealant melter, comprising:
a housing;

an aperture in said housing through which solid mass of sealant material is to be received;

a plurality of cutting blades within said housing;

an electrical heating element coupled to said cutting blades and adapted to heat the cutting blades; and an automatic ram device configured to force said solid mass of sealant material against said cutting blades; and wherein said cutting blades when heated and in response to the applied force of solid sealant material against the blades are configured to sever said mass of sealant material into smaller segments directed for receipt within a heating chamber.

33. An apparatus for creating and maintaining a reservoir of molten material, ready for being dispensed, in response to the receipt of a mass of sealant material, comprising:

a heating chamber configured to melt multiple segments of the sealant material into a quantity of molten sealant material and to retain a the quantity of molten sealant material at a substantially predetermined temperature;

a substantially sealed housing positioned over an opening in said heating chamber;

a loading door within said sealed housing through which said solid multiple segments of sealant material are received by said heating chamber;

a plurality of cutting blades positioned above said heating chamber;

at least one electrical heating element coupled to said cutting blades and configured to aid in severing said solid mass of sealant material into the multiple segments;

a pressure plate assembly within said housing configured to apply pressure upon said mass of sealant material against said cutting blades and toward said heating chamber; and means for dispensing said molten sealant material from said heating chamber.

34. A method of rapidly melting solid sealant material being introduced into a sealant melter, comprising:

(a) receiving said solid sealant material upon a cutter assembly which is coupled to a heating chamber configured for retaining a reservoir of molten sealant in preparation for being dispensed to a sealant applicator head;

(b) electrically heating said cutter assembly;

(c) applying a feed pressure upon said solid sealant material toward said cutter assembly; and (d) wherein said sealant material when fed under the applied feed pressure against the heated cutter assembly is segmented into smaller solid sealant material segments and advanced from the cutter assembly toward the heating chamber, and which smaller solid sealant material segments are subject to more rapid melting within a sealant melter.

35. An apparatus for conveying molten sealant material between a reservoir and an applicator head, comprising:

a flexible hose with a hose section and a flow passageway extending along a length within the hose section; and means for retaining a heating element within the flow passageway and extending apart from the hose section along a lengthwise portion of the flow passageway; and means for heating molten sealing material passing around the heating element retained within the flow passageway.

36. An apparatus as recited in claim 35, wherein said means for heating comprises an electrical heating element.

37. An apparatus as recited in claim 36, wherein said electrical heating element is electrically coupled through the exterior of said hose to a source of electrical power.

38. An apparatus as recited in claim 37, wherein said electrical coupling comprises conductors joined to a fluid coupling configured for attachment to said hose.

39. An apparatus as recited in claim 35, wherein said means for heating further comprises a control element for regulating the amount of heat dissipated by said means for heating.

40. An apparatus as recited in claim 39, wherein said control element is configured to regulate the amount of heat dissipation in response to registration of thermal-characteristics of said liquid being heated and communicated through said flexible hose.

41. An apparatus for heating sealants during conveyance through a flexible sealant distribution hose, comprising:

a heating element configured for being inserted into and retained within an interior flow passageway of the flexible sealant distribution hose and apart from the hose along a lengthwise portion of the interior flow passageway; and means for regulating heat dissipation in said heating element when said heating element is positioned within the flow passageway and molten sealant passes along the heating element within the flow passageway.

42. An apparatus as recited in claim 41, wherein said heating element comprises an electrical heating element.

43. An apparatus as recited in claim 42, wherein said means for regulating heat dissipation comprises an electrical heat controller that regulates the energy dissipation within said electrical heating element.

44. An apparatus as recited in claim 41, wherein said means for regulating heat dissipation is configured to modulate said heat dissipation in response to thermal-characteristics of said heated sealants.

45. An apparatus for conveying heated sealants between a reservoir and an applicator head, comprising:

a flexible hose with a hose section and a flow passageway extending along a length within the hose section;

an electrical heater disposed within the flow passageway and apart from the hose section along a lengthwise portion of the flow passageway; and means for regulating energy dissipation in said electrical heater in response to thermal-characteristics of said heated sealants passing through said flexible hose.

46. An apparatus as recited in claim 45, wherein said electrical heater comprises at least one resistive element configured to convert electrical current passing through said resistive element into thermal energy for heating said heated sealant passing through said flexible hose.

47. An apparatus as recited in claim 46, wherein said resistive element comprises an elongated loop.

48. An apparatus as recited in claim 45, wherein said electrical heater is configured to establish an electrical connection from the exterior of said flexible hose to said electrical heater which is retained within the interior flow passageway of said flexible hose.

49. An apparatus as recited in claim 48, wherein said electrical heater is configured with electrical connections which are established through a hose coupling attached to said flexible hose.

50. An apparatus as recited in claim 45, wherein said means for regulating energy dissipation operates in response to temperature as a thermal-characteristic of said heated sealant being communicated.

51. An apparatus as recited in claim 45, wherein said means for regulating energy dissipation, comprises:
- a sensor configured to register a thermal-characteristic of said heated sealant; and
- a heating regulator configured to modulate energy dissipation within said heater in response to the signal generated by said sensor.

52. An apparatus as recited in claim 51, wherein said sensor is coupled to a substantially thermally conductive hose connector through which said heated sealant passes.

53. An apparatus as recited in claim 51, wherein said sensor comprises a temperature transducer.

54. An apparatus as recited in claim 51, wherein said sensor comprises a thermocouple.

55. An apparatus as recited in claim 45, further comprising a thermally insulating material around the exterior of said flexible hose.

56. An apparatus for conveying heated sealants between a reservoir and an applicator head, comprising:
- a flexible hose with a hose section and a flow passageway extending along a length within an interior of the hose section;
- an electrical heater disposed within the interior flow passageway;
- wherein said electrical heater is retained apart from the hose section along a lengthwise interior portion of said flow passageway;
- a sensor configured to register a thermal-characteristic of said heated sealant; and
- a heating regulator configured to modulate energy dissipation within said heater in response to the signal generated by said sensor.

57. An apparatus as recited in claim 56, wherein said electrical heater comprises at least one resistive element configured to convert electrical current passing through said resistive element into thermal energy for heating said heated sealant passing through said flexible hose.

58. An apparatus as recited in claim 57, wherein said electrical heater is configured to establish an electrical connection from the exterior of said flexible hose.

59. A method of heating a liquid sealant material flowing through a flexible hose from a sealant reservoir to an applicator head, comprising:
- (a) inserting a electrical heating element into a flow passageway within an interior of a flexible hose and apart from the flexible hose along a lengthwise portion of the flow passageway;
- (b) establishing electrical connection with said heating element external to said flexible hose; and
- (c) regulating the power being applied to said heating element to provide a desired level of heating of liquid sealant material as it flows through the flow passageway of said flexible hose.

60. A method as recited in claim 59, wherein said electrical connection is established through a fluid coupling along the length of said flexible hose.

61. A method as recited in claim 59, further comprising insulating the exterior of said flexible hose.

62. A method as recited in claim 59, wherein said desired level of heating is determined in response to monitoring the temperature of said heated fluid being passed through said flexible hose.

63. An apparatus for applying a sealant to a surface, comprising:
- means for retaining a quantity of liquid sealant material under pressure against a surface being sealed with said sealant material; and
- means for automatically regulating the flow of said liquid sealant into said means for retaining a quantity of liquid sealant in response to the rate at which said sealant is being dispensed onto said surface.

64. An apparatus as recited in claim 63, wherein said pressure comprises a fluidic pressure exceeding ambient atmospheric pressure.

65. An apparatus as recited in claim 63, wherein said means for retaining a quantity of liquid sealant material is configured for retaining said liquid sealant proximal to a portion of a crack in said surface being filled with said liquid sealant.

66. An apparatus as recited in claim 63, wherein said means for retaining a quantity of liquid sealant material comprises:
- a dispensing tube configured for receiving a source of liquid sealant material; and
- a sealing chamber coupled to said dispensing tube and configured for retaining a variable volume of liquid sealant material in contact with said surface.

67. An apparatus as recited in claim 63, wherein said means for regulating the flow of said liquid sealant comprises a liquid flow regulator configured for controlling the flow of said liquid sealant material for maintaining a desired quantity of liquid sealant within said sealing chamber.

68. An apparatus as recited in claim 63, wherein said liquid flow regulator comprises a valve mechanism.

69. An apparatus for applying a liquid sealant material to a surface, comprising:
- a dispensing tube having a first end configured for connection to a source of liquid sealant material and a second end configured for dispensing said liquid sealants upon a surface;
- a sealing chamber coupled to said dispensing tube and configured for retaining a volume of liquid sealant in contact with said surface; and
- means for automatically regulating the flow of liquid sealant into said dispensing tube in response to the volume of said liquid sealant retained in said sealing chamber.

70. An apparatus as recited in claim 69, wherein said sealing chamber surrounds said dispensing tube.

71. An apparatus as recited in claim 69, further comprising:
- a contact ring coupled to said sealing chamber;
- said contact ring configured for sealing between said sealing chamber and said surface upon which said liquid sealant material is to be applied.

72. An apparatus as recited in claim 71, wherein said contact ring slidably engages said sealing chamber and is biased toward extension from said sealing chamber.

73. An apparatus as recited in claim 71, further comprising a rotatable housing member having a rotatable coupling connected between said contact ring and said sealing chamber.

74. An apparatus as recited in claim 73, wherein said rotatable housing is connected to said sealing chamber upon at least one set of bearings.

75. An apparatus as recited in claim 71, wherein said contact ring comprises a polymeric material.

76. An apparatus as recited in claim 71, wherein said contact ring comprises a rubber material.

77. An apparatus as recited in claim 71, wherein a lower surface of said contact ring comprises a brush having individual compliant segments.

78. An apparatus as recited in claim 71, further comprising means for preventing flow of said liquid sealant material from said dispensing tube when sealant pressure from a sealant source drops below a predetermined cut-off threshold level.

79. An apparatus as recited in claim 78, wherein said means for preventing flow comprises a check valve within said dispensing tube.

80. An apparatus as recited in claim 79, wherein said cut-off threshold level is set to approximately the pressure level provided by a standing column of sealant within the apparatus when not subjected to the added pressure from operation of a sealant pump.

81. An apparatus as recited in claim 79, wherein said check valve is biased toward a closed position by a spring.

82. An apparatus as recited in claim 79, further comprising means for modulating the position of said sealing chamber to equalize wear arising from contact with said pavement surface.

83. An apparatus as recited in claim 80, wherein said means for modulating the position of said sealing chamber comprises:
   a rotational coupling joined to said sealing chamber and
   a rotational drive actuator configured for engaging said rotational coupling to rotate the angular position of said sealing chamber.

84. An apparatus as recited in claim 79, wherein said dispensing tube is configured with insulation for retaining the heat of heated liquid sealants being passed through said dispensing tube.

85. An apparatus as recited in claim 69, further comprising means for heating liquid sealants passing through said dispensing tube.

86. An apparatus as recited in claim 85, wherein said means for heating comprises:
   an input coupling for receiving a flow of hot fluid from a heated source;
   at least one passageway within said dispensing tube which is configured for retaining a flow of said hot fluid proximal to a portion of the length of said dispensing tube for heating said dispensing tube; and
   an output coupling for returning said hot fluid to said heated source.

87. An apparatus as recited in claim 69, wherein said means for regulating the flow of liquid sealant is configured to admit a flow of liquid sealant into said sealing chamber in response to lowered levels of sealant volume retained within said sealing chamber.

88. An apparatus as recited in claim 69, wherein said means for regulating the flow of liquid sealant into said sealing chamber comprises:
   a feedback sensor configured for generating a signal in response to the amount of said sealant contained within said sealing chamber; and
   a flow control circuit which is configured to meter sealant flow into said dispensing tube in response to said signal from said feedback sensor.

89. An apparatus as recited in claim 70, further comprising means for biasing the sealing chamber toward a reduced volume level of retained sealant.

90. An apparatus as recited in claim 89, further comprising:
   a float member coupled with said sealing chamber; and
   a biasing member urging said float member toward said reduced volume levels of retained sealant within said sealing chamber.

91. An apparatus as recited in claim 90, wherein said biasing member comprises a spring for biasing said float member within said sealant chamber to urge it toward said reduced volume of retained sealant.

92. An apparatus as recited in claim 69, further comprising means for modulating the volume of said sealing chamber.

93. An apparatus as recited in claim 92, wherein said means for modulating the volume of said sealing chamber, comprises:
   a float plate movably coupled to said sealing chamber to control the volume of said sealing chamber; and
   an actuator coupled to said float plate for adjusting the position of said float plate and the resultant volume within said sealing chamber in response to sealant dispensing conditions.

94. An apparatus as recited in claim 93, wherein said actuator is selected from the group of actuators consisting of pneumatic actuators, hydraulic actuators, and electrical actuators.

95. An apparatus as recited in claim 93:
   wherein said sealing chamber is configured as a cylindrical section;
   wherein said float plate surrounds said dispensing tube and is configured for being physically displaced in response to changes in said sealing chamber volume.

96. An apparatus as recited in claim 69, wherein said sealing chamber is configured for maintaining the volume of liquid sealant in said sealing chamber at a pressure exceeding ambient pressure.

97. An apparatus as recited in claim 69, further comprising a volume adjusting member coupled to said sealing chamber, and configured to move in response to volume changes in said sealing chamber that arise in response to the amount of liquid sealant supplied through said dispensing tube less the amount of liquid sealant being applied to said surface.

98. An apparatus as recited in claim 69, further comprising a translation stage to which said dispensing tube and said sealing chamber are coupled for adjusting vertical position over an underlying surface being filled.

99. An apparatus as recited in claim 98, wherein said translation stage is configured for automatically adjusting the position of said sealing chamber in response to positional displacements of said underlying surface upon which liquid sealant material is being dispensed.

100. An apparatus for applying sealants to surfaces, comprising:
   a dispensing tube having a distal end configured for connection to a source of liquid sealant material and a proximal end configured for dispensing said liquid sealant material upon an underlying surface;
   a sealing chamber coupled to said dispensing tube and configured for retaining a volume of said liquid sealant material in contact with said underlying surface; and
   a valve coupled to said dispensing tube which is configured for automatically controlling the flow of said liquid sealant material through said dispensing tube into said sealing chamber.

101. An apparatus as recited in claim 100, wherein said valve is configured to operate in response to liquid sealant volume changes within said sealing chamber.

102. An apparatus for applying sealants to surfaces, comprising:
   a dispensing tube having a distal end configured for connection to a source of liquid sealant material and a proximal end configured for dispensing sealants upon a surface;

a sealing chamber surrounding said proximal end of said dispensing tube and configured for retaining liquid sealants in contact with said surface; and a fluid flow controller coupled to said sealing chamber and configured for automatically modulating the flow of liquid sealant from said dispensing tube in response to the amount of said liquid sealant retained within said sealing chamber.

103. An apparatus as recited in claim 102, wherein said dispensing tube has a distal end configured having for connecting to a source of said liquid sealant material.

104. An apparatus as recited in claim 102, wherein said dispensing tube has a proximal end configured for outputting said liquid sealant material upon said surface.

105. An apparatus as recited in claim 104, further comprising a check valve disposed in a proximal end of said dispensing tube and configured for limiting the flow of said liquid sealant from said dispensing tube.

106. A method of applying liquid sealants for the filling of pavement cracks, comprising:
(a) retaining a first opening of a sealing chamber in substantially sealed contact against a pavement surface;
(b) automatically modulating the amount of said liquid sealant delivered into said sealing chamber in response to the volume of said liquid sealant retained within said sealing chamber; and
(c) moving said sealing chamber along pavement cracks to fill said pavement cracks from the material being retained within said liquid sealing chamber.

107. A method as recited in claim 106, further comprising limiting the amount of said liquid sealant delivered into said sealing chamber so that excess sealant is not retained within said sealing chamber after said pavement crack has been filled.

108. A method as recited in claim 106, further comprising heating said liquid sealant being delivered to said sealing chamber.

109. A method as recited in claim 106, wherein said modulating of the amount of said liquid sealant being delivered into said liquid sealing chamber comprises:
sensing the volume of liquid sealant within said sealing chamber; and
activating a fluidic valve restricting the flow of liquid sealant into said chamber in response to increasing volumes of liquid sealant being retained in said sealing chamber.

110. A method as recited in claim 109, further comprising rotating said sealing chamber in response to moving of said sealing chamber over said pavement surface.

111. A method as recited in claim 106, wherein said sealing chamber is configured with a sealing ring coupled to said sealing chamber to enhance sealing between said first opening in said sealing chamber and said pavement surface.

112. An apparatus for receiving a mass of solid sealant material and dispensing molten sealant to an applicator head, comprising:
means for severing solid sealant material into multiple substantially unmelted segments;
means for applying a feed pressure to said solid sealant material against said means for severing;
a heating chamber configured for receiving said segments of sealant material;
a flexible hose with a hose section and a flow passageway extending along a length within the hose section and that is coupled to said heating chamber and configured for communicating heated sealants to an applicator head;
a heater disposed within the interior flow passageway and extending apart from the hose section along at least a part of the length of said flexible hose; and
means for regulating energy dissipation within in said heater in response to thermal-characteristics of the heated sealants being communicated through said flexible hose.

113. An apparatus for melting solid sealant and dispensing the molten sealant, comprising:
a heating chamber configured for receiving solid sealant through a first opening, melting and retaining a quantity of said molten sealant material, and for dispensing said molten sealant through a second opening;
an enclosure coupled to said first opening and configured with a loading aperture through which solid blocks of sealant are to be received;
a plurality of cutting blades within said enclosure;
a heating element retained within said cutting blades;
a heating controller to regulate the temperature of said first heating elements within said cutting blades;
a movable member retained within said enclosure and configured for urging solid blocks of sealant material received within said enclosure toward said plurality of cutting blades in response to a driving force;
an actuator coupled to said movable member for supplying said driving force;
wherein the cutting blades under controlled heating are adapted to cut the solid blocks of sealant material under an applied force from the movable member against the blades into multiple substantially unmelted segments;
wherein the enclosure is adapted to deliver the multiple substantially unmelted segments of sealant material into the heating chamber;
a flexible hose joined to said heating chamber and configured with a hose section extending along a length and a flow passageway configured for communicating heated sealants being dispensed;
a second heating element disposed within the interior of the flow passageway and apart from the hose section along at least a portion of the length of said flexible hose;
a sensor configured for registering a thermal-characteristic of said fluid passing through said flexible hose; and
a heating regulator that modulates energy dissipation within said second heating element in response to thermal-characteristics registered by said sensor.

* * * * *